(12) United States Patent
Saito et al.

(10) Patent No.: US 9,803,122 B2
(45) Date of Patent: Oct. 31, 2017

(54) REFRIGERATION OIL COMPOSITION

(71) Applicant: Japan Sun Oil Company, Ltd., Tokyo (JP)

(72) Inventors: Rei Saito, Tokyo (JP); Shuichiro Tanaka, Tokyo (JP); Yoshinori Suzuki, Tokyo (JP); Toshio Shishikura, Tokyo (JP)

(73) Assignee: JAPAN SUN OIL COMPANY, LTD., Tokyo (JP)

( * ) Notice: Subject to any disclaimer, the term of this patent is extended or adjusted under 35 U.S.C. 154(b) by 0 days.

(21) Appl. No.: 14/369,006

(22) PCT Filed: Dec. 27, 2012

(86) PCT No.: PCT/JP2012/083982
§ 371 (c)(1),
(2) Date: Jun. 26, 2014

(87) PCT Pub. No.: WO2013/100100
PCT Pub. Date: Jul. 4, 2013

(65) Prior Publication Data
US 2014/0374647 A1    Dec. 25, 2014

(30) Foreign Application Priority Data

Dec. 27, 2011  (JP) ................................. 2011-286045
Dec. 11, 2012  (JP) ................................. 2012-270435

(51) Int. Cl.
*C09K 5/04*       (2006.01)
*C10M 105/38*     (2006.01)
*C10M 171/00*     (2006.01)

(52) U.S. Cl.
CPC .............. *C09K 5/045* (2013.01); *C09K 5/041* (2013.01); *C09K 5/042* (2013.01); *C10M 105/38* (2013.01);
(Continued)

(58) Field of Classification Search
CPC ....... C09K 5/041; C09K 5/045; C10M 105/38
See application file for complete search history.

(56) References Cited

U.S. PATENT DOCUMENTS 5,021,179 A   6/1991 Zehler et al.
5,494,597 A   2/1996 Krevalis, Jr. et al.
(Continued)

FOREIGN PATENT DOCUMENTS

CN   102191112   9/2011
DE   41 05 956   8/1992
(Continued)

OTHER PUBLICATIONS

PCT Written Opinion, PCT/JP2012/083982, dated Dec. 2011.*
(Continued)

*Primary Examiner* — John Hardee
(74) *Attorney, Agent, or Firm* — Hamre, Schumann, Mueller & Larson, P.C.

(57) ABSTRACT

The refrigeration oil composition for HFC-based refrigerants or HC-based refrigerants of the invention includes a product of the esterification of an alcohol ingredient including pentaerythritol and dipentaerythritol and a fatty acid ingredient including at least one of a linear or branched fatty acid having 5 carbon atoms and a linear or branched fatty acid having 6 carbon atoms and at least one of a linear or branched fatty acid having 8 carbon atoms and a linear or branched fatty acid having 9 carbon atoms, wherein at least one of the fatty acid having 5 carbon atoms and the fatty acid having 6 carbon atoms in the fatty acid ingredient accounts for 20 to 100% by mol of the total amount of the fatty acid ingredient, and either the alcohol ingredient or the fatty acid ingredient is a mixture.

5 Claims, 1 Drawing Sheet

(52) U.S. Cl.
CPC ... *C10M 171/008* (2013.01); *C09K 2205/104* (2013.01); *C09K 2205/126* (2013.01); *C10M 2207/026* (2013.01); *C10M 2207/042* (2013.01); *C10M 2207/2835* (2013.01); *C10M 2223/041* (2013.01); *C10N 2220/022* (2013.01); *C10N 2220/023* (2013.01); *C10N 2220/032* (2013.01); *C10N 2220/302* (2013.01); *C10N 2220/303* (2013.01); *C10N 2230/06* (2013.01); *C10N 2230/10* (2013.01); *C10N 2230/66* (2013.01); *C10N 2240/30* (2013.01)

(56) References Cited

U.S. PATENT DOCUMENTS

| | | | |
|---|---|---|---|
| 5,833,876 A | | 11/1998 | Schnur et al. |
| 5,853,609 A | * | 12/1998 | Schnur ................ C10M 105/38 252/67 |
| 5,906,769 A | * | 5/1999 | Schnur ................ C09K 5/045 252/68 |
| 6,228,820 B1 | | 5/2001 | Sakai et al. |
| 2001/0019120 A1 | | 9/2001 | Schnur et al. |
| 2003/0047707 A1 | | 3/2003 | Schnur et al. |
| 2005/0145823 A1 | | 7/2005 | Yamada et al. |
| 2006/0255313 A1 | | 11/2006 | Yamada et al. |
| 2006/0278845 A1 | | 12/2006 | Kajiki et al. |
| 2010/0190672 A1 | | 7/2010 | Carr et al. |
| 2013/0207024 A1 | | 8/2013 | Takigawa et al. |

FOREIGN PATENT DOCUMENTS

| | | | |
|---|---|---|---|
| JP | 5-132684 | | 5/1993 |
| JP | 7-507346 | | 8/1995 |
| JP | 8-503975 | | 4/1996 |
| JP | 2787083 B | | 8/1998 |
| JP | 2000-502391 | | 2/2000 |
| JP | 2002-129178 | | 5/2002 |
| JP | 2002/356694 | | 12/2002 |
| JP | 2003-501614 | | 1/2003 |
| JP | 2003-041278 | | 2/2003 |
| JP | 3510888 B | | 3/2004 |
| JP | 2005-171233 | | 6/2005 |
| JP | 3909744 B | | 4/2007 |
| JP | 2010-031134 | | 2/2010 |
| JP | 2010-235960 | | 10/2010 |
| JP | 2011-190319 | * | 9/2011 |
| JP | 2011-195630 | | 10/2011 |
| JP | 2011-195631 | | 10/2011 |
| WO | 93/24587 | | 12/1993 |
| WO | 93/25629 | | 12/1993 |
| WO | 97/11933 | | 4/1997 |
| WO | 97/23585 | | 7/1997 |
| WO | 2012/026303 | | 3/2012 |
| WO | 2013/027428 | | 2/2013 |

OTHER PUBLICATIONS

Office Action issued in corresponding Chinese Patent Application No. 201280065302.6, dated Jul. 22, 2015, 13 pages with an English translation.
Extended European Search Report issued in corresponding European Application No. 12 86 2756.9, dated Aug. 4, 2015, 6 pages.
Office Action issued in corresponding Japanese Patent Application No. 2011-286045, dated May 24, 2016, 5 pages with translation.
Office Action issued in corresponding Chinese Patent Application No. 201280065302.6, dated May 23, 2016, 12 pages with translation.
Office Action issued in corresponding Japanese Application Serial No. 2011-286045, dated Dec. 8, 2015, 11 pages with English translation.
Office Action issued in corresponding Taiwanese Application No. 10421699070, dated Dec. 16, 2015, 9 pages with translation.

* cited by examiner

REFRIGERATION OIL COMPOSITION

TECHNICAL FIELD

The present invention relates to a refrigeration oil composition including a polyol ester oil which is soluble with either hydrofluorocarbon-based refrigerants or hydrocarbon-based refrigerants.

BACKGROUND ART

A refrigeration oil composition obtained by dissolving a refrigerant in a refrigeration oil is used as a working fluid in the refrigeration cycle in automotive air conditioners, domestic air conditioners, air conditioning within buildings, cold storehouses, refrigerators, and the like, and hydrofluorocarbon-based refrigerants which contain no chlorine and are constituted of hydrogen, carbon, and fluorine are in use from the standpoint of environmental conservation. Polyol ester oils are used accordingly as refrigeration oils for dissolving the hydrofluorocarbon-based refrigerants therein (see, for example, patent document 1).

However, even refrigeration oil compositions containing the same hydrofluorocarbon-based refrigerant usually differ in requirements concerning the temperature at which the composition separates into the refrigeration oil and the refrigerant (two-layer separation temperature), kinematic viscosity, etc. depending on applications or purposes. Although it is generally necessary to lower the kinematic viscosity of a polyol ester oil for increasing the solubility of a hydrofluorocarbon-based refrigerant therein, the reduced kinematic viscosity results in a decrease in the lubricity of the refrigeration oil composition. Meanwhile, in cases when the lubricity is improved by heightening the kinematic viscosity of the polyol ester oil, the hydrofluorocarbon-based refrigerant comes to separate out.

There are hence cases where a polyol ester oil which is excellent in terms of the solubility of hydrofluorocarbon-based refrigerants therein and a polyol ester oil having excellent lubricity are mixed with each other and used so as to result in solubility and kinematic viscosity that are suitable for the application or purpose (see, for example, patent documents 2 and 3). However, in case where the two polyol ester oils differ considerably in solubility with refrigerants, the polyol ester oil which is less soluble in the refrigerant gradually separates out, depending on the refrigerant used, during the period when the refrigeration oil composition circulates in the refrigeration cycle.

Meanwhile, since hydrofluorocarbon-based refrigerants have an exceedingly high global warming potential, hydrocarbon-based refrigerants, which are considerably low in global warming potential although flammable, are employed in some applications. There is a possibility that such hydrocarbon-based refrigerants might be increasingly used in various applications in future so long as apparatus modification measures are taken to cope with the problem concerning flammability. As refrigeration oils for dissolving hydrocarbon-based refrigerants therein, use has been mainly made of naphthenic or paraffinic mineral oils, alkylbenzene oils, ether oils, fluorinated oils, and the like. However, polyol ester-based lubricating oils having come to be used for the purpose of further improving lubricity. For example, an ester oil which is an ester of a neopentyl polyol including neopentyl glycol or pentaerythritol with a branched monovalent fatty acid having 7 to 9 carbon atoms (see patent document 4) and a polyol ester oil having an alkyl group having 11 to 19 carbon atoms (see patent document 5) are in use.

However, as in the case of hydrofluorocarbon-based refrigerants, such refrigeration oils usually differ in requirements concerning two-layer separation temperature, kinematic viscosity, etc. depending on the applications or purposes of the apparatus to be used. In addition, since hydrocarbon-based refrigerants have an exceedingly low density which is about one-half the density of hydrofluorocarbon-based refrigerants, the volume concentration of a hydrocarbon-based refrigerant dissolved in a refrigeration oil even in the same weight concentration as before is twice and the viscosity, which is influenced by volume concentration, is considerably lower than the conventional refrigerant-solution viscosity. This decrease in refrigerant-solution viscosity is a factor which causes a decrease in lubricity. In the case of using a refrigerant and a refrigeration oil which have high solubility with each other, the refrigeration oil to be used is required to have high kinematic viscosity from the standpoint of heightening the refrigerant-solution viscosity. However, since the refrigerant and the refrigeration oil considerably differ in density and because the refrigeration oil having too high a viscosity has impaired flowability, the refrigerant and the refrigeration oil are less apt to mingle with each other in an actual machine, resulting in a possibility that the refrigeration oil might be supplied in a reduced amount to the surfaces to be lubricated and the lubricity be impaired rather than improved.

However, the refrigeration oil described in patent document 4 has a low viscosity (about 10 to 32 mm$^2$/s at 40° C. according to Examples) and may raise difficulties when used in large refrigerated facilities. Furthermore, the refrigeration oil described in patent document 5 is intended to be used with R290, and is usable only in limited applications.

Meanwhile, in production sites for producing refrigeration oils, it is necessary that many kinds of polyol ester oils produced from a large number of raw materials are ready for use so as to be capable of coping with differences in applications or purposes and in the kinds of hydrofluorocarbon-based refrigerants, and this has resulted in complexation of procurement of raw materials, production management, and product control. The polyol ester oils described in patent documents 2 and 3 also are each intended to be suited for specific refrigerants and specific apparatus, and when used in combination with other refrigerants or in other apparatus, show too high or too low solubility with the refrigerants or have too high or too low viscosity. In particular, it is impossible to obtain suitable solubility with less soluble refrigerants, such as difluoromethane (R-32) refrigerant, while ensuring necessary viscosity.

The same applies to hydrocarbon-based refrigerants. Although it is necessary that many kinds of refrigeration oils produced from a large number of raw materials are ready, the current prior-art techniques including patent documents 4 and 5 are ineffective in overcoming such problems.

PRIOR-ART DOCUMENTS

Patent Documents

Patent Document 1: Japanese Patent No. 2787083
Patent Document 2: Japanese Patent No. 3510888
Patent Document 3: JP-A-2010-235960
Patent Document 4: Japanese Patent No. 3909744
Patent Document 5: JP-A-2010-31134

SUMMARY OF THE INVENTION

Problems that the Invention is to Solve

An object of the invention, which has been achieved in view of the circumstances described above, is to provide a refrigeration oil composition which eliminates the necessity of making many kinds of refrigeration oils or raw materials therefor ready for coping with differences in applications or purposes and in the kinds of refrigerants and which not only is free from separation between oils that have been mixed together, but also is made to have solubility and viscosity that are suitable for any of various hydrofluorocarbon-based refrigerants or hydrocarbon-based refrigerants and for any of various refrigerated facilities, by changing the ratio of specific raw materials.

Means for Solving the Problems

In order to accomplish the object, the present invention provides the following refrigeration oil compositions.
(1) A refrigeration oil composition including a polyol ester oil which is soluble with either a hydrofluorocarbon-based refrigerant or a hydrocarbon-based refrigerant,
wherein the polyol ester oil is a product of the esterification of an alcohol ingredient including pentaerythritol and dipentaerythritol and a fatty acid ingredient including at least one of a linear or branched fatty acid having 5 carbon atoms and a linear or branched fatty acid having 6 carbon atoms and including at least one of a linear or branched fatty acid having 8 carbon atoms and a linear or branched fatty acid having 9 carbon atoms,
at least one of the linear or branched fatty acid having 5 carbon atoms and linear or branched fatty acid having 6 carbon atoms in the fatty acid ingredient accounts for 20 to 100% by mol of the total amount of the fatty acid ingredient, and
either the alcohol ingredient or the fatty acid ingredient is a mixture composed of two components.
(2) The refrigeration oil composition according to (1) above, wherein at least one of the fatty acids which constitute the fatty acid ingredient is a branched fatty acid.
(3) The refrigeration oil composition according to (1) above, wherein the fatty acid ingredient is a mixture of: at least one of 2-methylbutanoic acid and 2-methylpentanoic acid; and at least one of 2-ethylhexanoic acid and 3,5,5-trimethylhexanoic acid.
(4) The refrigeration oil composition according to (1) above, wherein the fatty acid ingredient is a mixture of 2-methylbutanoic acid and 2-ethylhexanoic acid.
(5) The refrigeration oil composition according to any one of (1) to (4) above,
wherein the hydrofluorocarbon-based refrigerant includes at least one member selected from R-32, R-410A, HFO-1234yf, and HFO-1234ze(E).
(6) The refrigeration oil composition according to any one of (1) to (4) above,
wherein the hydrocarbon-based refrigerant including at least one member selected from R-290, R-600a, and R-1270.
(7) The refrigeration oil composition according to any one of (1) to (6) above, having a low-temperature-side two-layer separation temperature and a high-temperature-side two-layer separation temperature, with respect to separation from the hydrofluorocarbon-based refrigerant or hydrocarbon-based refrigerant as measured at an oil content of 20% by weight, of +20 degrees or lower and +35 degrees or higher, respectively.
(8) The refrigeration oil composition according to any one of (1) to (7) above, containing at least one of an antioxidant, an epoxy-compound acid scavenger, and an extreme-pressure agent.

Advantage of the Invention

In the refrigeration oil composition of the invention, the polyol ester oil is a product of the esterification of a specific alcohol ingredient and a specific fatty acid ingredient, and has, in the molecule, both a component having excellent solubility with the hydrofluorocarbon-based refrigerant or hydrocarbon-based refrigerant and a component having excellent lubricity. Because of this, the refrigeration oil composition is free from the separation between oils which occurs in the presence of a refrigerant due to a difference therebetween in solubility with the refrigerant, as in the case where a plurality of polyol ester oils are used as a mixture thereof. In addition, the polyol ester oil does not separate from the hydrofluorocarbon-based refrigerant or hydrocarbon-based refrigerant to stagnate in the refrigerating circuit. Since this refrigeration oil is made to have solubility and viscosity that are suitable for any of various hydrofluorocarbon-based refrigerants or hydrocarbon-based refrigerants and for any of various refrigerated facilities, by changing the ratio of specific raw materials, the refrigeration oil composition can satisfactorily and stably exhibit the lubricating performance and cooling performance in refrigerated facilities.

Furthermore, the same alcohols and the same fatty acids can be used in common for constituting the specific alcohol ingredient and the specific fatty acid ingredient, respectively, regardless of the kind of the hydrofluorocarbon-based refrigerant or hydrocarbon-based refrigerant. Consequently, it is not necessary that raw materials for the polyol ester oil are prepared for each refrigerant, as in conventional techniques, and the complexity of procurement of raw materials and production management can be reduced.

MODES FOR CARRYING OUT THE INVENTION

Figure 1:
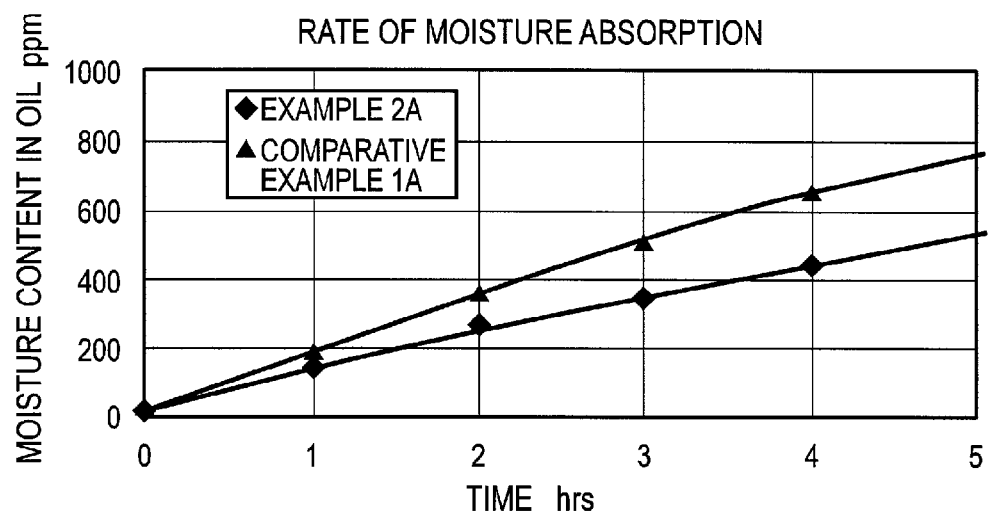
FIG. 1 is graphs which show the results of examinations for a relationship between open time and moisture content in oil, with respect to Example 2A and Comparative Example 1A.

The refrigeration oil composition of the invention includes a polyol ester oil. As the polyol ester oil, use is made of a product of the esterification of an alcohol ingredient including pentaerythritol and dipentaerythritol and a fatty acid ingredient including at least one of a linear or branched fatty acid having 5 carbon atoms and a linear or branched fatty acid having 6 carbon atoms and including at least one of a linear or branched fatty acid having 8 carbon atoms and a linear or branched fatty acid having 9 carbon atoms. It is, however, noted that either the alcohol ingredient or the fatty acid ingredient is a mixture composed of two components. Meanwhile, since a fatty acid can be present as a racemate, a substance which is one fatty acid but is a racemate is regarded as two kinds of fatty acids. This polyol ester oil can be synthesized so as to be applicable to any of various hydrofluorocarbon refrigerants or hydrocarbon-based refrigerants which differ in solubility and to any of various refrigerated facilities which differ in required kinematic viscosity, by merely changing the ratio of components with respect to a specific combination of components of the alcohol ingredient and fatty acid ingredient as raw materials.

Pentaerythritol and dipentaerythritol, which are used as the alcohol ingredient, give an esterification product that not only has lubricity but also is less apt to undergo influences of moisture, the susceptibility to which is a drawback of ester compounds, and has exceedingly high hydrolytic resistance. Furthermore, the solubility with the hydrofluorocarbon-based refrigerant or hydrocarbon-based refrigerant and the affinity for metal surfaces can be regulated by selecting the kinds of the fatty acids to be used for the esterification. Since dipentaerythritol is a dimer of pentaerythritol, a combination thereof with pentaerythritol brings about excellent stability. By regulating the proportion of the pentaerythritol to the dipentaerythritol, the viscosity of the lubricating oil can be set to a value required by a refrigerated facility. Furthermore, by regulating the high-temperature-side two-layer separation temperature to a more suitable value, lubricity within the compressor can be ensured.

The fatty acid ingredient is configured of at least one of a linear or branched fatty acid having 5 carbon atoms (hereinafter inclusively referred to as "pentanoic acid") and a linear or branched fatty acid having 6 carbon atoms (hereinafter inclusively referred to as "hexanoic acid") and containing a linear or branched fatty acid having 8 carbon atoms (hereinafter inclusively referred to as "octanoic acid") and a linear or branched fatty acid having 9 carbon atoms (hereinafter inclusively referred to as "nonanoic acid").

At least one of the pentanoic acid and hexanoic acid is a fatty acid ingredient for improving solubility with the refrigerant. Although a fatty acid ingredient having a smaller number of carbon atoms is more effective in improving solubility, use is made of the fatty acid(s) having 5 or 6 carbon atoms in order to ensure hydrolytic stability and viscosity to some degree. From the standpoint of ensuring the solubility of the polyol ester oil with refrigerant R-32, which is especially poorly soluble, the upper limit of the length of the carbon chain in this ingredient is 5 in terms of the number of carbon atoms; normal pentanoic acid is applicable but normal hexanoic acid is undesirable. This fatty acid serves also as an ingredient for regulating viscosity and ensuring lubricity, and heightens the polarity of the molecule to thereby reduce solubility and improve the affinity for metal surfaces.

At least one of the octanoic acid and nonanoic acid is a fatty acid ingredient for ensuring viscosity and lubricity and for improving solubility with the refrigerant. A fatty acid ingredient having a larger number of carbon atoms is more effective in improving viscosity and has reduced polarity to improve solubility. However, in view of a decrease in solubility and from the standpoint of ensuring low-temperature flowability and oxidative stability, use is made of the fatty acid(s) having 8 or 9 carbon atoms, which has been actually used for conventional refrigeration oils.

Especially from the standpoints of reducing adverse influences on solubility and improving hydrolytic stability and viscosity, the branched fatty acids are more preferred. Consequently, the branched form of each acid is more effective than the linear form thereof in enhancing the solubility of the hydrofluorocarbon-based refrigerant or hydrocarbon-based refrigerant and is capable of further lowering the low-temperature-side two-layer separation temperature. Furthermore, since the branched form is more effective in heightening viscosity than the linear form, use of the branched form facilitates the setting of viscosity to that required by a refrigerated facility. In addition, the branched form is capable of more improving hydrolytic stability than the linear form. Consequently, a combination of fatty acid components which constitute the fatty acid ingredient and in which at least one is the branched form is preferred to a combination in which all the fatty acids are linear. Most preferred of such combinations is one in which all the fatty acids are branched.

The branched chains of the fatty acids preferably are methyl group or ethyl group, and it is preferable that the number of branches in each branched fatty acid is 1 to 3. Furthermore, a preferred branching position is the 2-position, i.e., the position adjacent to the carboxyl group. Preferred of such branched fatty acids are 2-methylbutanoic acid as a branched pentanoic acid, 2-methylpentanoic acid as a branched hexanoic acid, 2-ethylhexanoic acid as a branched octanoic acid, and 3,5,5-trimethylhexanoic acid as a branched nonanoic acid. Consequently, preferred as the fatty acid ingredient are mixtures of: at least one of 2-methylbutanoic acid and 2-methylpentanoic acid; and at least one of 2-ethylhexanoic acid and 3,5,5-trimethylhexanoic acid. Especially preferred is a mixture of 2-methylbutanoic acid and 2-ethylhexanoic acid.

In the invention, the kinematic viscosity of the polyol ester oil is 15 to 350 mm$^2$/s (40° C.), and is suitably selected in accordance with the apparatus in which the refrigeration oil composition is to be used and with applications. Especially for air conditioners, it is preferable that the kinematic viscosity of the polyol ester oil is 46 to 100 mm$^2$/s (40° C.). Kinematic viscosities thereof less than 46 mm$^2$/s (40° C.) result in poor lubricity, while kinematic viscosities thereof exceeding 100 mm$^2$/s (40° C.) result in too high viscosity resistance and a considerable decrease in performance. A more preferred range of the kinematic viscosity thereof is 50 to 80 mm$^2$/s (40° C.). For small refrigerated facilities, it is preferable that the kinematic viscosity of the polyol ester oil is 22 to 68 mm$^2$/s (40° C.). Kinematic viscosities thereof less than 22 mm$^2$/s (40° C.) result in poor lubricity, while kinematic viscosities thereof exceeding 68 mm$^2$/s (40° C.) result in too high viscosity resistance and a considerable decrease in performance. A more preferred range of the kinematic viscosity thereof is 30 to 50 mm$^2$/s (40° C.). For large refrigerated facilities, it is preferable that the kinematic viscosity of the polyol ester oil is 68 to 320 mm$^2$/s (40° C.). Kinematic viscosities thereof less than 68 mm$^2$/s (40° C.) result in poor lubricity or poor compression chamber-sealing properties, while kinematic viscosities thereof exceeding 320 mm$^2$/s (40° C.) result in too high viscosity resistance and a considerable decrease in performance. Since refrigerated facilities differ markedly in required kinematic viscosity depending on the compressor and refrigeration system, it is necessary that the polyol ester oil is regulated so as to have the kinematic viscosity required by a refrigerated facility. Such a kinematic viscosity may be attained by regulating the proportion in which pentaerythritol and dipentaerythritol are mixed together; pentaerythritol is used in an amount of 10 to 90% by mol based on the whole alcohol ingredient, with the remainder being dipentaerythritol. In the case where it is necessary that a plurality of polyol ester oils which each are the polyol ester oil of the invention and which differ in kinematic viscosity are mixed with each other, the resultant mixture can be used without suffering separation between the oils so long as the solubility of each polyol ester oil with the refrigerant to be used is appropriate. Especially for air conditioners, it is preferred to employ such a proportion that the amount of pentaerythritol is 40 to 80% by mol based on the whole alcohol ingredient, with the remainder being dipentaerythritol. For small refrigerated facilities, it is preferred to employ such a proportion that the amount of pentaerythritol is 60 to 90% by mol based on the whole alcohol ingredient, with the remainder being dipentaerythritol. For large refrigerated facilities, it is preferred to employ such a proportion that the amount of pentaerythritol is 10 to 40% by mol based on the whole alcohol ingredient, with the remainder being dipentaerythritol.

Meanwhile, the hydrofluorocarbon-based refrigerant to be dissolved in the refrigeration oil composition is not particularly limited, and one which has conventionally been used as a refrigerant can be used, such as, for example, R-134a (tetrafluoroethane) or R-410A (a mixture of difluoromethane and pentafluoroethane). It is, however, noted that requirements for environmental conservation are becoming severer and, especially in Europe, it was decided to use HFO-1234yf (2,3,3,3-tetrafluoro-1-propene) as a new refrigerant in the automotive air conditioners of motor vehicles manufactured in and after the year 2011 (2nd International Workshop on Mobile Air Conditioning and Auxiliary Systems-Trono, Italy Nov. 29, 2007 and European Automotive A/C Convention, Sep. 22-23, 2008). Besides that refrigerant, the following are receiving attention as next-generation refrigerants: HFO-1234ze(E) (trans-1,3,3,3-tetrafluoro-1-propene), R-32 (difluoromethane), a mixture of HFO-1234yf (2,3,3,3-tetrafluoro-1-propene) and R-32 (difluoromethane), and a mixture of HFO-1234ze(E) (trans-1,3,3,3-tetrafluoro-1-propene) and R-32 (difluoromethane). In the invention also, it is preferred to use HFO-1234yf, HFO-1234ze(E), or R-32 as the hydrofluorocarbon-based refrigerant. Any one of these refrigerants and R-410A, which is a refrigerant used hitherto, may be used alone, or two or more thereof may be used as a mixture thereof. In particular, R-32 is receiving attention as a next-generation refrigerant since R-32 has a low global warming potential (GWP), is not a mixed refrigerant, and is relatively inexpensive. However, this refrigerant has low solubility with conventional polyol ester oils and are prone to cause two-layer separation. According to the invention, however, by regulating the components of the alcohol ingredient and of the fatty acid ingredient and regulating the mixing proportions thereof, a refrigeration oil composition which is prevented from undergoing two-layer separation and has satisfactory lubricity is obtained even when R-32 is used.

The hydrocarbon-based refrigerant also is not limited, and use can be made of any one of hydrocarbon-based refrigerants which have hitherto been used in some appliances, such as, for example, R-600a, R-290 (propane), and R-1270 (propylene), or a mixture of two or more thereof. In particular, R-290 is receiving attention as a next-generation refrigerant since R-290 has a low global warming potential (GWP), is not a mixed refrigerant, and is relatively inexpensive. However, this refrigerant has too high solubility with conventional naphthenic mineral oils to cause a decrease in viscosity due to the diluting effect of the refrigerant and is hence prone to cause a decrease in lubricity. According to the invention, however, by regulating the components of the alcohol ingredient and of the fatty acid ingredient and regulating the mixing proportions thereof, a refrigeration oil composition having satisfactory lubricity is obtained using R-290.

In order to produce the refrigeration oil composition of the invention, a hydrofluorocarbon-based refrigerant or a hydrocarbon-based refrigerant is selected first. Thereafter, the mixing proportion of pentaerythritol to dipentaerythritol, the mixing proportion of at least one of pentanoic acid and hexanoic acid to at least one of octanoic acid and nonanoic acid, and the mixing proportion of the alcohol ingredient to the fatty acid ingredient are set while taking account of solubility with the selected refrigerant and lubricity, and the alcohol ingredient is subjected to esterification reaction with the fatty acid ingredient to produce a polyol ester oil.

In the refrigeration oil composition, it is preferable that with respect to separation from the hydrofluorocarbon-based refrigerant or hydrocarbon-based refrigerant, the high-temperature-side two-layer separation temperature is +35° C. or higher, in particular, in the range of +40 to +65° C., and the low-temperature-side two-layer separation temperature is +20° C. or lower, in particular, 0° C. or lower. For use in refrigerated facilities or large air conditioners, there is a request for −30° C. or lower, or for −50° C. or lower. Such solubility can be obtained by regulating the mixing proportion of at least one of the pentanoic acid and hexanoic acid to at least one of the octanoic acid and nonanoic acid in the fatty acid ingredient. Specifically, the amount of at least one of pentanoic acid and hexanoic acid is regulated to 20 to 100% by mol based on the whole fatty acid ingredient, with the remainder being at least one of octanoic acid and nonanoic acid. Especially for domestic air conditioners in which R-32 is used, a preferred proportion is one in which 2-methylbutanoic acid is used in an amount of 40 to 60% by mol, with the remainder being 2-ethylhexanoic acid.

In case where the high-temperature-side two-layer separation temperature is not +35° C. or higher and the low-temperature-side two-layer separation temperature is not +20° C. or lower, the solubility between the polyol ester oil and the hydrofluorocarbon-based refrigerant or hydrocarbon-based refrigerant is insufficient and separation between the two occurs in high-temperature parts of the refrigeration cycle, e.g., the condenser, and in low-temperature parts thereof, e.g., the evaporator. Once the separation occurs, the following adverse influences are exerted thereby: the polyol ester oil stagnates in heat exchangers, such as the condenser and the evaporator, to inhibit heat exchange; the amount of the polyol ester oil which returns to the compressor decreases to cause compressor troubles due to insufficient lubrication; and the separation inhibits refrigerant circulation to thereby considerably lower the cooling performance. Incidentally, any polyol ester oil produced from one alcohol and one fatty acid is prone to crystallize or solidify at room temperature to low temperatures and hence cannot be adopted. In addition, it is noted that in cases when a fatty acid which is apparently constituted of one component but is a racemate is employed, this fatty acid is regarded as being constituted of two components. Consequently, 2-methylbutanoic acid, which is a pentanoic acid, is more effective in preventing crystallization than 3-methylbutanoic acid, which also is a pentanoic acid, and 2-methylpentanoic acid, which is a hexanoic acid, is more effective in preventing crystallization, than 2-ethylbutanoic acid, which also is a hexanoic acid.

In particular, for refrigerated facilities or large air conditioners in which R-32 is used, a preferred proportion is one in which 2-methylbutanoic acid is used in an amount of 60 to 90% by mol, with the remainder being 2-ethylhxanoic acid. For refrigerated facilities in which HFO-1234ze(E) is used, preferred are a proportion in which 2-methylbutanoic acid is used in an amount of 20 to 60% by mol, with the remainder being 2-ethylhexanoic acid, and a proportion in which 2-methylpentanoic acid is used in an amount of 20 to 60% by mol, with the remainder being 3,5,5-trimethylhexanoic acid.

There are no limitations on the esterification reaction, and the reaction can be conducted in accordance with methods in practical use. In the esterification reaction, the carboxyl groups of the fatty acids react with all the hydroxyl groups of the alcohols. Consequently, once the mixing proportion of pentaerythritol to dipentaerythritol in the alcohol ingredient is decided, the total amount of hydroxyl groups in the mixture is also determined and, hence, the amount of the fatty acid ingredient to be used may be set in accordance with the total amount of hydroxyl groups.

Processes for producing the refrigeration oil composition are specifically shown below. For example, in the case where HFO-1234ze(E) has been selected as a hydrofluorocarbon-based refrigerant for small refrigerated facilities and where the required kinematic viscosity at 40° C. is 15 to 60 mm²/s, then an alcohol ingredient in which pentaerythritol accounts for 60 to 100% by mol thereof, with the remainder being dipentaerythritol, and a fatty acid ingredient in which 2-methylbutanoic acid accounts for 20 to 90% by mol thereof, with the remainder being at least one of 2-ethylhexanoic acid and 3,5,5-trimethylhexanoic acid, are used and esterified to produce a polyol ester oil. Thereafter, HFO-1234ze(E) is dissolved in this polyol ester oil to obtain a refrigeration oil composition. The refrigeration oil composition thus obtained satisfies the high-temperature-side two-layer separation temperature, low-temperature-side two-layer separation temperature, and kinematic viscosity described above and is excellent in terms of refrigerating performance and lubricating performance.

Meanwhile, in the case where, for example, HFO-1234ze (E) has been selected for large refrigerated facilities and where the required kinematic viscosity at 40° C. is 90 to 240 mm²/s, then use is made of either a polyol ester oil obtained by esterifying an alcohol ingredient in which pentaerythritol accounts for 0 to 70% by mol thereof, with the remainder being dipentaerythritol, and a fatty acid ingredient in which at least one of 2-methylbutanoic acid and 2-methylpentanoic acid accounts for 20 to 60% by mol thereof, with the remainder being 2-ethylhexanoic acid, or a polyol ester oil obtained by esterifying an alcohol ingredient in which pentaerythritol accounts for 40 to 100% by mol thereof, with the remainder being dipentaerythritol, and a fatty acid ingredient in which at least one of 2-methylbutanoic acid and 2-methylpentanoic acid accounts for 20 to 60% by mol thereof, with the remainder being 3,5,5-trimethylhexanoic acid. HFO-1234ze(E) is dissolved in this polyol ester oil to obtain a refrigeration oil composition.

Furthermore, in the case where, for example, R-32 has been selected for domestic air conditioners and where the required kinematic viscosity at 40° C. is 40 to 80 mm²/s, then use is made of either a polyol ester oil obtained by esterifying an alcohol ingredient in which pentaerythritol accounts for 40 to 80% by mol thereof, with the remainder being dipentaerythritol, and a fatty acid ingredient in which 2-methylbutanoic acid accounts for 40 to 70% by mol thereof, with the remainder being 2-ethylhexanoic acid, or a polyol ester oil obtained by esterifying an alcohol ingredient in which pentaerythritol accounts for 50 to 100% by mol thereof, with the remainder being dipentaerythritol, and a fatty acid ingredient in which 2-methylbutanoic acid accounts for 30 to 70% by mol thereof, with the remainder being 3,5,5-trimethylhexanoic acid. R-32 is dissolved in this polyol ester oil to obtain a refrigeration oil composition.

Moreover, also in the case of a conventional mode in which R-410A is selected for domestic air conditioners, use can be made of a polyol ester oil obtained by esterifying an alcohol ingredient in which pentaerythritol accounts for 40 to 80% by mol thereof, with the remainder being dipentaerythritol, and a fatty acid ingredient in which 2-methylbutanoic acid accounts for 40 to 70% by mol thereof, with the remainder being 2-ethylhexanoic acid. R-410A is dissolved in this polyol ester oil to obtain a refrigeration oil composition.

Furthermore, also in the case of a conventional mode in which R-410A is selected for large air conditioners, use can be made of a polyol ester oil obtained by esterifying an alcohol ingredient in which pentaerythritol accounts for 40 to 80% by mol thereof, with the remainder being dipentaerythritol, and a fatty acid ingredient in which 2-methylbutanoic acid accounts for 40 to 60% by mol thereof, with the remainder being 2-ethylhexanoic acid. R-410A is dissolved in this polyol ester oil to obtain a refrigeration oil composition.

Moreover, also in the case where R-32, which is a next-generation refrigerant, and R-410A, which is a conventional refrigerant, mingle with each other in a large air conditioner because of, for example, the configuration of the facilities, use can be made of a polyol ester oil obtained by esterifying an alcohol ingredient in which pentaerythritol accounts for 40 to 80% by mol thereof, with the remainder being dipentaerythritol, and a fatty acid ingredient in which 2-methylbutanoic acid accounts for 40 to 60% by mol thereof, with the remainder being 2-ethylhexanoic acid. A mixed refrigerant composed of R-32 and R-410A is dissolved in this polyol ester oil to obtain a refrigeration oil composition.

Furthermore, in the case where a mixed refrigerant composed of R-32 and either HFO-1234yf or HFO-1234ze(E) has been selected for domestic air conditioners and where the required kinematic viscosity at 40° C. is 40 to 80 mm²/s, then use is made of either a polyol ester oil obtained by esterifying an alcohol ingredient in which pentaerythritol accounts for 40 to 80% by mol thereof, with the remainder being dipentaerythritol, and a fatty acid ingredient in which 2-methylbutanoic acid accounts for 20 to 50% by mol thereof, with the remainder being 2-ethylhexanoic acid, or a polyol ester oil obtained by esterifying an alcohol ingredient in which pentaerythritol accounts for 50 to 100% by mole thereof, with the remainder being dipentaerythritol, and a fatty acid ingredient in which 2-methylbutanoic acid accounts for 30 to 70% by mol thereof, with the remainder being 3,5,5-trimethylhexanoic acid. A mixed refrigerant composed of R-32 and either HFO-1234yf or HFO-1234ze (E) is dissolved in the polyol ester oil to obtain a refrigeration oil composition.

Furthermore, in the case where R-290 has been selected as a hydrocarbon-based refrigerant for small refrigerated facilities and where the required kinematic viscosity at 40° C. is 15 to 60 mm²/s, then an alcohol ingredient in which pentaerythritol accounts for 60 to 100% by mol thereof, with the remainder being dipentaerythritol, and a fatty acid ingredient in which 2-methylbutanoic acid accounts for 20 to 90% by mol thereof, with the remainder being at least one of 2-ethylhexanoic acid and 3,5,5-trimethylhexanoic acid, are used and esterified to produce a polyol ester oil. Such a refrigeration oil composition satisfies the high-temperature-side two-layer separation temperature, low-temperature-side two-layer separation temperature, and kinematic viscosity described above and is excellent in terms of refrigerating performance and lubricating performance.

Furthermore, in the case where, for example, R-1270 has been selected for large refrigerated facilities and where the required kinematic viscosity at 40° C. is 90 to 240 mm²/s, then use is made of either a polyol ester oil obtained by esterifying an alcohol ingredient in which pentaerythritol accounts for 0 to 70% by mole thereof, with the remainder being dipentaerythritol, and a fatty acid ingredient in which at least one of 2-methylbutanoic acid and 2-methylpentanoic acid accounts for 20 to 60% by mol thereof, with the remainder being 2-ethylhexanoic acid, or a polyol ester oil obtained by esterifying an alcohol ingredient in which pentaerythritol accounts for 40 to 100% by mol thereof, with the remainder being dipentaerythritol, and a fatty acid ingredient in which at least one of 2-methylbutanoic acid and 2-methylpentanoic acid accounts for 20 to 60% by mol thereof, with the remainder being 3,5,5-trimethylhexanoic acid.

Furthermore, in the case where, for example, R-290 has been selected for domestic air conditioners and where the required kinematic viscosity at 40° C. is 40 to 80 mm$^2$/s, then use is made of either a polyol ester oil obtained by esterifying an alcohol ingredient in which pentaerythritol accounts for 40 to 80% by mol thereof, with the remainder being dipentaerythritol, and a fatty acid ingredient in which 2-methylbutanoic acid accounts for 40 to 70% by mol thereof, with the remainder being 2-ethylhexanoic acid, or a polyol ester oil obtained by esterifying an alcohol ingredient in which pentaerythritol accounts for 50 to 100% by mol thereof, with the remainder being dipentaerythritol, and a fatty acid ingredient in which 2-methylbutanoic acid accounts for 30 to 70% by mol thereof, with the remainder being 3,5,5-trimethylhexanoic acid.

Furthermore, in the case where, for example, a mixed refrigerant composed of R-290 and R-1270 has been selected for domestic air conditioners and where the required kinematic viscosity at 40° C. is 40 to 80 mm$^2$/s, then use is made of either a polyol ester oil obtained by esterifying an alcohol ingredient in which pentaerythritol accounts for 40 to 80% by mol thereof, with the remainder being dipentaerythritol, and a fatty acid ingredient in which 2-methylbutanoic acid accounts for 20 to 50% by mol thereof, with the remainder being 2-ethylhexanoic acid, or a polyol ester oil obtained by esterifying an alcohol ingredient in which pentaerythritol accounts for 50 to 100% by mol thereof, with the remainder being dipentaerythritol, and a fatty acid ingredient in which 2-methylbutanoic acid accounts for 30-70% by mol thereof, with the remainder being 3,5,5-trimethylhexanoic acid.

As described above, by using pentaerythritol, dipentaerythritol, at least one of pentanoic acid and hexanoic acid, and at least one of octanoic acid and nonanoic acid in common and by merely changing the mixing proportions thereof, polyol ester oils which are usable with various hydrofluorocarbon-based refrigerants or hydrocarbon-based refrigerants are obtained. Consequently, to prepare pentaerythritol, dipentaerythritol, at least one of pentanoic acid and hexanoic acid, and at least one of octanoic acid and nonanoic acid beforehand suffices for the production site, and the complexation of raw material procurement and of production management can be significantly reduced as compared with the case where many kinds of polyol ester oils are prepared.

Various additives can be added to the refrigeration oil composition of the invention. The polyol ester oil has the possibility of undergoing oxidative deterioration or hydrolysis due to the outside air or moisture which has infiltrated into the refrigeration cycle or due to the influence of residues, e.g., a rust preventive, which remain in the refrigeration cycle, resulting in a possibility that an acidic component might be produced by the deterioration or hydrolysis to corrode the inside of the system. Furthermore, refrigerants having a double bond in the molecule, such as HFO-1234yf, HFO-1234ze(E), and R-1270, are more prone, than other hydrofluorocarbon-based refrigerants, to undergo oxidative deterioration or hydrolysis due to heat or the outside air or moisture which has infiltrated into the refrigeration cycle or due to the influence of residues, e.g., a rust preventive, which remain in the refrigeration cycle, resulting in a possibility that an acidic component might be produced by the deterioration or hydrolysis to corrode the inside of the system. It is therefore preferred to add an epoxy-compound acid scavenger. In particular, epoxy-compound acid scavengers such as glycidyl ethers and glycidyl esters are preferred since such compounds have a high acid-scavenging effect. Furthermore, it is preferred to use an epoxy-compound acid scavenger having an epoxycycloalkyl group or an epoxy-compound acid scavenger obtained by introducing a glycidyl group into an end of polypropylene glycol, from the standpoint of affinity for the polyol ester oil and hydrofluorocarbon-based refrigerant. Moreover, an epoxy-compound acid scavenger obtained by introducing a glycidyl group into an alcohol or fatty acid having 10 or less carbon atoms is preferred since this compound shows improved acid-scavenging ability due to the high dispersibility thereof in the hydrofluorocarbon-based refrigerant or hydrocarbon-based refrigerant.

By adding a lubricity improver, such as an extreme-pressure agent or an oiliness agent, not only the metallic surfaces of sliding portions can be prevented from wearing or seizing but also the lubricity is enhanced to reduce frictional heating, making it possible to inhibit the decomposition of refrigerants having a double bond in the molecule, such as HFO-1234yf, HFO-1234ze(E), and R-1270. As the extreme-pressure agent, use may be made of a phosphoric acid type extreme-pressure agent or a thiophosphoric acid type extreme-pressure agent in accordance with requirements of the refrigerated facility or air conditioner. Since thiophosphoric acid type extreme-pressure agents cause precipitation of a sulfur compound depending on the conditions and it is hence necessary to minimize the amount thereof if these agents are added, phosphoric acid type extreme-pressure agents are preferred. Examples of the phosphoric acid type extreme-pressure agents include tricresyl phosphate, triphenyl phosphate, tris(tert-butylphenyl) phosphate, monophenyl bis(tert-butylphenyl)phosphate, and diphenyl tert-butylphenyl phosphate. As the oiliness agent, use may be made of one which has no active element, e.g., phosphorus or sulfur, and which utilizes the affinity of oxygen for metals, such as a long-chain-alkyl alcohol, alkyl monoglyceride, or fatty acid methyl ester. Examples thereof include oleyl alcohol, isostearyl alcohol, oleyl monoglyceride, linolenyl monoglyceride, and methyl oleate.

It is also preferred to add an antioxidant in order to inhibit refrigerants having a double bond in the molecule, such as HFO-1234yf, HFO-1234ze(E), and R-1270, from decomposing or from undergoing oxidative deterioration due to the infiltration of outside air into the refrigeration cycle. Examples of the antioxidant include phenolic antioxidants such as 2,6-di-tert-butyl-4-methylphenol, 2,6-di-tert-butyl-4-ethylphenol, and 2,2'-methylenebis(4-methyl-6-tert-butyl-phenol) and amine-compound antioxidants such as phenyl-α-naphthylamine and N,N'-diphenyl-p-phenylenediamine. However, since the amine-compound antioxidants have reactivity with refrigerants having a double bond in the molecule, such as HFO-1234yf, HFO-1234ze(E), and R-1270, it is preferred to use these antioxidants in the refrigeration oil to be applied to other hydrofluorocarbon-based refrigerants or to hydrocarbon-based refrigerants.

Any one of the epoxy-compound acid scavenger, lubricity improver, and antioxidant may be used alone, or the three agents can be used in combination. There are no limitations on the amount of each agent to be added, so long as the effect thereof is produced. It is, however, preferable that the amounts of the epoxy-compound acid scavenger, lubricity improver, and antioxidant are 0.25 to 2% by mass, 0.5 to 4% by mass, and 0.1 to 1% by mass, respectively, based on the whole refrigeration oil composition. In case where the addition amount of each agent is less than the lower limit, the effect thereof cannot be sufficiently produced. Even when the amount of each agent is larger than the upper limit, not only the effect is not enhanced any more, but also the relative content of the polyol ester oil is low, resulting in poor lubricity.

In addition to those additives, additives in general use may be added for the purpose of improving performances other than those mentioned above.

EXAMPLES

Test Examples are shown below to further explain the invention, but the invention should not be construed as being limited by the following Examples in any way. Incidentally, Test A relates to refrigeration oil compositions for hydrofluorocarbon-based refrigerants, while Test B relates to refrigeration oil compositions for hydrocarbon-based refrigerants.

<Test A: Refrigeration Oil Compositions for Hydrofluorocarbon-Based Refrigerants>

The alcohol ingredients and fatty acid ingredients shown in Table A were esterified to produce polyol ester oils. In the table, PE represents pentaerythritol, DiPE represents dipentaerythritol, LPt represents normal pentanoic acid (a pentanoic acid), 2 MBu represents DL-2-methylbutanoic acid (a pentanoic acid), LHx represents normal hexanoic acid (a hexanoic acid), 2 MPt represents DL-2-methylpentanoic acid (a hexanoic acid), 2EBu represents 2-ethylbutanoic acid (a hexanoic acid), 2EHx represents a 2-ethylhexanoic acid (an octanoic acid), and TMHx represents 3,5,5-trimethylhexanoic acid (a nonanoic acid), and the mixing proportion of each alcohol ingredient to the fatty acid ingredient is in molar ratio. A poly(vinyl ether) oil (comparative oil 15A) which is currently in use as a refrigeration oil was added as a comparative oil besides ester oils produced from the alcohol ingredient and fatty acid ingredient. Furthermore, comparative oils 18A, 19A, and 20A were added as mixed oils. The refrigeration oil A used in the mixed oils is in use as a refrigeration oil for HFC refrigerators; this refrigeration oil is highly soluble with refrigerant R-32 but has too low viscosity to be used as such in the refrigerated facilities or air conditioners to which the invention is intended to be applied.

TABLE A (Polyol ester oils used in Examples and Comparative Examples)

| Oil No. | Alcohol ingredient | | Fatty acid ingredient | |
|---|---|---|---|---|
| | PE | DiPE | Acid 1 | Acid 2 |
| Synthetic oil 1A | 0.60 | 0.40 | 2MBu: 0.4 | 2EHx: 0.6 |
| Synthetic oil 2A | 0.55 | 0.45 | 2MBu: 0.5 | 2EHx: 0.5 |
| Synthetic oil 3A | 0.55 | 0.45 | 2MBu: 0.7 | 2EHx: 0.3 |
| Synthetic oil 4A | 0.55 | 0.45 | 2MBu: 0.85 | 2EHx: 0.15 |
| Synthetic oil 5A | 0.30 | 0.70 | 2MBu: 0.5 | 2EHx: 0.5 |
| Synthetic oil 6A | 0.55 | 0.45 | 2MBu: 0.45 | 2EHx: 0.55 |
| Synthetic oil 7A | 1.0 | 0.0 | 2MBu: 0.5 | TMHx: 0.5 |
| Synthetic oil 8A | 0.50 | 0.50 | 2MBu: 1.0 | TMHx: 0.0 |
| Synthetic oil 9A | 1.0 | 0.0 | 2MBu: 0.4 | TMHx: 0.6 |
| Synthetic oil 10A | 0.85 | 0.15 | 2MBu: 0.6 | TMHx: 0.4 |
| Synthetic oil 11A | 0.0 | 1.0 | LPt: 0.8 | TMHx: 0.2 |
| Synthetic oil 12A | 0.25 | 0.75 | 2MPt: 0.8 | 2EHx: 0.2 |
| Synthetic oil 13A | 0.25 | 0.75 | 2MPt: 1.0 | — |
| Synthetic oil 14A | 1.0 | 0.0 | 2MPt: 0.5 | TMHx: 0.5 |
| Synthetic oil 15A | 1.0 | 0.0 | 2EBu: 0.75 | TMHx: 0.25 |
| Synthetic oil 16A | 0.0 | 1.0 | 2MBu: 0.5 | 2EHx: 0.5 |
| Synthetic oil 17A | 0.0 | 1.0 | 2MBu: 0.65 | 2EHx: 0.35 |
| Synthetic oil 18A | 0.0 | 1.0 | 2MBu: 1.0 | — |
| Synthetic oil 19A | 0.10 | 0.90 | 2MBu: 1.0 | — |
| Synthetic oil 20A | 0.70 | 0.30 | 2MBu: 0.5 | TMHx: 0.5 |
| Synthetic oil 21A | 0.50 | 0.50 | 2MBu: 0.5 | TMHx: 0.5 |
| Synthetic oil 22A | 0.30 | 0.70 | 2MBu: 0.5 | TMHx: 0.5 |
| Synthetic oil 23A | 0.0 | 1.0 | 2MBu: 0.9 | TMHx: 0.1 |
| Synthetic oil 24A | 0.0 | 1.0 | 2MBu: 0.65 | TMHx: 0.35 |
| Synthetic oil 25A | 0.0 | 1.0 | 2MBu: 0.5 | TMHx: 0.5 |
| Synthetic oil 26A | 1.0 | 0.0 | LPt: 0.5 | 2EHx: 0.5 |
| Synthetic oil 27A | 1.0 | 0.0 | LPt: 0.75 | TMHx: 0.25 |
| Synthetic oil 28A | 1.0 | 0.0 | LPt: 0.5 | TMHx: 0.5 |
| Synthetic oil 29A | 1.0 | 0.0 | 2MBu: 1.0 | — |
| Synthetic oil 30A | 1.0 | 0.0 | 2MBu: 0.75 | 2EHx: 0.25 |
| Synthetic oil 31A | 1.0 | 0.0 | 2MBu: 0.5 | 2EHx: 0.5 |
| Synthetic oil 32A | 0.70 | 0.30 | 2MBu: 0.85 | 2EHx: 0.15 |
| Synthetic oil 33A | 1.0 | 0.0 | 2MBu: 0.75 | TMHx: 0.25 |
| Synthetic oil 34A | 1.0 | 0.0 | 2MPt: 1.0 | — |
| Synthetic oil 35A | 1.0 | 0.0 | 2MPt: 0.75 | 2EHx: 0.25 |
| Comparative oil 1A | 1.0 | 0.0 | 2EHx: 0.5 | TMHx: 0.5 |
| Comparative oil 2A | 1.0 | 0.0 | LHx: 0.25 | TMHx: 0.75 |
| Comparative oil 3A | 0.0 | 1.0 | LHx: 0.65 | TMHx: 0.35 |
| Comparative oil 4A | 0.0 | 1.0 | LHx: 1.0 | — |
| Comparative oil 5A | 1.0 | 0.0 | 2EBu: 1.0 | — |
| Comparative oil 6A | 0.65 | 0.35 | 2EHx: 1.0 | — |
| Comparative oil 7A | 0.0 | 1.0 | LHx: 0.35 | TMHx: 0.65 |
| Comparative oil 8A | 1.0 | 0.0 | TMHx: 1.0 | — |
| Comparative oil 9A | 0.0 | 1.0 | 2EHx: 0.5 | TMHx: 0.5 |
| Comparative oil 10A | 0.0 | 1.0 | 2MPt: 0.35 | 2EHx: 0.65 |
| Comparative oil 11A | 1.0 | 0.0 | 2EHx: 1.0 | — |
| Comparative oil 12A | 1.0 | 0.0 | LPt: 0.25 | 2EHx: 0.75 |
| Comparative oil 13A | 1.0 | 0.0 | LHx: 0.5 | TMHx: 0.5 |
| Comparative oil 14A | 1.0 | 0.0 | 2MPt: 0.25 | 2EHx: 0.75 |
| Comparative oil 15A | refrigerant R-410A/ether oil for air conditioner | | | |
| Comparative oil 16A | complex ester obtained from PE, 2EHx, adipic acid, etc. | | | |
| Comparative oil 17A | 0.8 | 0.2 | LPt: 0.4 n-heptanoic acid: 0.4 TMHx: 0.2 | |
| Comparative oil 18A | mixed oil (refrigeration oil A, 25 wt % + comparative oil 1, 75 wt %) Makeup of refrigeration oil A Alcohol: neopentyl glycol Fatty acid: 2EHx | | | |
| Comparative oil 19A | mixed oil (refrigeration oil A, 50 wt % + comparative oil 9, 50 wt %) Makeup of refrigeration oil A Alcohol: neopentyl glycol Fatty acid: 2EHx | | | |
| Comparative oil 20A | mixed oil (refrigeration oil A, 30 wt % + comparative oil 16, 70 wt %) Makeup of refrigeration oil A Alcohol: neopentyl glycol Fatty acid: 2EHx | | | |

Note 1)
Comparative oil 1A and comparative oil 15A are in use in air conditioners where R-410A, which is a current refrigerant, is used.
Note 2)
Although synthetic oil 18A appears to be produced from one alcohol and one fatty acid, it has been ascertained that the fatty acid was a racemate and composed of two components and, hence, the oil does not solidify.
Note 3)
Comparative oil 16A is in use in large refrigerated facilities or air conditioners where R-410A, 407C, 134a, and 404A, which are current refrigerants, are used.
Note 4)
Although synthetic oils 29A and 34A each appear to be produced from one alcohol and one fatty acid, it has been ascertained that the fatty acid was a racemate and composed of two components and, hence, the oil does not solidify.
Note 5)
Synthetic oil 17A is in use in refrigerated facilities or air conditioners where R-134a and 404A, which are current refrigerants, are used.
Note 6)
Refrigeration oil A used in comparative oils 18A to 20A is in use in refrigeration oils for HFC-refrigerant refrigerators.
Two-layer separation temperatures for refrigeration oil A and refrigerant R-32 (oil content, 20 wt %): high temperature, +70° C. or higher; low temperature, −20° C. Kinematic viscosity of refrigeration oil A: 7.56 (40° C.), 2.07 (100° C.)

Test Example 1A: With Respect to Kinematic Viscosities of Each Polyol Ester Oil Synthesized Each of the polyol ester oils and comparative oils was examined for kinematic viscosity at 40° C. and 100° C. The results of the measurement are shown in Tables 3 and 4.

TABLE 3

| Example No. | Oil No. | Kinematic viscosity | | Remarks |
|---|---|---|---|---|
| | | mm$^2$/s (40° C.) | mm$^2$/s (100° C.) | |
| Example 1A | synthetic oil 1A | 69.7 | 8.67 | — |
| Example 2A | synthetic oil 2A | 66.9 | 8.42 | — |
| Example 3A | synthetic oil 3A | 66.0 | 8.39 | — |

TABLE 3-continued

| Example No. | Oil No. | Kinematic viscosity mm²/s (40° C.) | mm²/s (100° C.) | Remarks |
|---|---|---|---|---|
| Example 4A | synthetic oil 4A | 64.5 | 8.20 | — |
| Example 5A | synthetic oil 5A | 97.8 | 10.9 | — |
| Example 6A | synthetic oil 6A | 75.1 | 9.10 | — |
| Example 7A | synthetic oil 7A | 60.0 | 7.76 | — |
| Example 8A | synthetic oil 8A | 66.1 | 8.23 | — |
| Example 9A | synthetic oil 9A | 64.4 | 8.20 | — |
| Example 10A | synthetic oil 10A | 62.5 | 7.98 | — |
| Example 11A | synthetic oil 11A | 67.1 | 9.88 | — |
| Example 12A | synthetic oil 12A | 69.0 | 9.26 | — |
| Example 13A | synthetic oil 13A | 61.8 | 8.71 | — |
| Example 14A | synthetic oil 14A | 53.9 | 7.39 | — |
| Example 15A | synthetic oil 15A | 70.0 | 6.99 | — |
| Example 16A | synthetic oil 16A | 140 | 13.8 | — |
| Example 17A | synthetic oil 17A | 139 | 13.6 | — |
| Example 18A | synthetic oil 18A | 141 | 13.6 | — |
| Example 19A | synthetic oil 19A | 124 | 12.4 | — |
| Example 20A | synthetic oil 20A | 108 | 11.4 | — |
| Example 21A | synthetic oil 21A | 149 | 14.0 | — |
| Example 22A | synthetic oil 22A | 196 | 16.7 | — |
| Example 23A | synthetic oil 23A | 164 | 15.0 | — |
| Example 24A | synthetic oil 24A | 225 | 18.3 | — |
| Example 25A | synthetic oil 25A | 276 | 20.9 | — |
| Example 26A | synthetic oil 26A | 27.8 | 4.99 | — |
| Example 27A | synthetic oil 27A | 24.8 | 4.88 | — |
| Example 28A | synthetic oil 28A | 42.7 | 6.69 | — |
| Example 29A | synthetic oil 29A | 25.7 | 4.39 | — |
| Example 30A | synthetic oil 30A | 29.4 | 4.83 | — |
| Example 31A | synthetic oil 31A | 36.8 | 5.47 | — |
| Example 32A | synthetic oil 32A | 47.3 | 6.48 | — |
| Example 33A | synthetic oil 33A | 37.3 | 5.66 | — |
| Example 34A | synthetic oil 34A | 22.4 | 4.31 | — |
| Example 35A | synthetic oil 35A | 26.0 | 4.67 | — |

TABLE 4

| Comparative Example No. | Oil No. | Kinematic viscosity mm²/s (40° C.) | mm²/s (100° C.) | Remarks |
|---|---|---|---|---|
| Comparative Example 1A | comparative oil 1A | 67.8 | 8.34 | — |
| Comparative Example 2A | comparative oil 2A | 64.6 | 8.50 | — |
| Comparative Example 3A | comparative oil 3A | 88.0 | 11.9 | — |
| Comparative Example 4A | comparative oil 4A | 53.0 | 8.72 | solidified at room temperature |
| Comparative Example 5A | comparative oil 5A | 54.0 | 6.36 | solidified at room temperature |
| Comparative Example 6A | comparative oil 6A | 70.4 | 8.74 | — |
| Comparative Example 7A | comparative oil 7A | 181 | 17.6 | — |
| Comparative Example 8A | comparative oil 8A | 114 | 11.5 | solidified at room temperature |
| Comparative Example 9A | comparative oil 9A | 228 | 19.2 | — |
| Comparative Example 10A | comparative oil 10A | 116 | 12.9 | — |
| Comparative Example 11A | comparative oil 11A | 44.3 | 6.26 | — |
| Comparative Example 12A | comparative oil 12A | 34.1 | 5.44 | — |
| Comparative Example 13A | comparative oil 13A | 40.5 | 6.58 | — |
| Comparative Example 14A | comparative oil 14A | 36.4 | 5.60 | — |
| Comparative Example 15A | comparative oil 15A | 64.7 | 7.95 | — |
| Comparative Example 16A | comparative oil 16A | 226 | 21.8 | — |
| Comparative Example 17A | comparative oil 17A | 30.3 | 5.73 | — |
| Comparative Example 18A | comparative oil 18A | 33.8 | 5.44 | — |
| Comparative Example 19A | comparative oil 19A | 32.4 | 5.42 | — |
| Comparative Example 20A | comparative oil 20A | 67.4 | 9.42 | — |

Test 2A: With Respect to Solubility with R-32

Each polyol ester oil and R-32 were enclosed in a glass tube so as to result in an oil content of 20% by weight, and the glass tube was shaken to dissolve the R-32 in the polyol ester oil. After the dissolution, the glass tube was placed in a water bath and gradually heated to measure the temperature at which the even layer separated into an oil layer and a refrigerant layer (high-temperature-side two-layer separation temperature). Meanwhile, the glass tube was placed in a cooling chamber and gradually cooled to measure the temperature at which the even layer separated into an oil layer and a refrigerant layer (low-temperature-side two-layer separation temperature).

The results of the measurements and the kinematic viscosities are both shown in Table 5 to Table 7.

TABLE 5

Refrigerant R-32/air conditioner
(as refrigeration oil having kinematic viscosity at 40° C. of 50-100 mm²/s)

| Example Comparative Example No. | Oil No. | Properties High-temperature-side two-layer separation temperature ° C. | Low-temperature-side two-layer separation temperature ° C. | Kinematic viscosity (40° C.) mm²/s |
|---|---|---|---|---|
| Example 36A | synthetic oil 1A | +48 | +16 | 69.7 |
| Example 37A | synthetic oil 2A | +58 | −6 | 66.9 |
| Example 38A | synthetic oil 3A | +68 | −30 | 66.0 |
| Example 39A | synthetic oil 4A | +70 or higher | −50 | 64.5 |
| Example 40A | synthetic oil 5A | +52 | +4 | 97.8 |
| Example 41A | synthetic oil 6A | +51 | +9 | 75.1 |

TABLE 5-continued

Refrigerant R-32/air conditioner
(as refrigeration oil having kinematic viscosity at 40° C. of 50-100 mm²/s)

| | | Properties | | |
|---|---|---|---|---|
| Example Comparative Example No. | Oil No. | High-temperature-side two-layer separation temperature ° C. | Low-temperature-side two-layer separation temperature ° C. | Kinematic viscosity (40° C.) mm²/s |
| Example 42A | synthetic oil 7A | +67 | −13 | 60.0 |
| Example 43A | synthetic oil 8A | +70 or higher | −50 or lower | 66.1 |
| Example 44A | synthetic oil 9A | +62 | −2 | 64.4 |
| Example 45A | synthetic oil 10A | +68 | −24 | 62.5 |
| Example 46A | synthetic oil 11A | +54 | −12 | 67.1 |
| Example 47A | synthetic oil 12A | +46 | −1 | 69.0 |
| Example 48A | synthetic oil 13A | +61 | −18 | 61.8 |
| Example 49A | synthetic oil 14A | +57 | +7 | 53.9 |
| Example 50A | synthetic oil 15A | +56 | +10 | 70.0 |
| Comparative Example 18A | comparative oil 1A | separated throughout the whole range | separated throughout the whole range | 67.8 |
| Comparative Example 19A | comparative oil 2A | separated throughout the whole range | separated throughout the whole range | 64.6 |
| Comparative Example 20A | comparative oil 3A | Separated throughout the whole range | separated throughout the whole range | 88.0 |
| Comparative Example 21A | comparative oil 4A | Separated throughout the whole range | separated throughout the whole range | 53.0 |
| Comparative Example 22A | comparative oil 5A | +70 or higher | −14 | 54.0 solidified at room temperature |
| Comparative Example 23A | comparative oil 6A | Separated throughout the whole range | separated throughout the whole range | 70.4 |
| Comparative Example 24A | comparative oil 15A | separated throughout the whole range | separated throughout the whole range | 64.7 |
| Comparative Example 25A | comparative oil 20A | separated throughout the whole range | separated throughout the whole range | 67.4 |

TABLE 6

Refrigerant R-32/large refrigerated facility or air conditioner
(as refrigeration oil having kinematic viscosity at 40° C. of 100-320 mm²/s)

| | | Properties | | |
|---|---|---|---|---|
| Example Comparative Example No. | Oil No. | High-temperature-side two-layer separation temperature ° C. | Low-temperature-side two-layer separation temperature ° C. | Kinematic viscosity (40° C.) mm²/s |
| Example 51A | synthetic oil 16A | +45 | +10 | 140 |
| Example 52A | synthetic oil 17A | +57 | −14 | 139 |
| Example 53A | synthetic oil 18A | +70 or higher | −50 or lower | 141 |
| Example 54A | synthetic oil 19A | +70 or higher | −50 or lower | 124 |
| Example 55A | synthetic oil 20A | +61 | −3 | 108 |
| Example 56A | synthetic oil 21A | +56 | −1 | 149 |
| Example 57A | synthetic oil 22A | +52 | +8 | 196 |
| Example 58A | synthetic oil 23A | +70 or higher | −50 or lower | 164 |
| Example 59A | synthetic oil 24A | +53 | −8 | 225 |
| Example 60A | synthetic oil 25A | +45 | +15 | 276 |
| Comparative Example 26A | comparative oil 7A | separated throughout the whole range | separated throughout the whole range | 181 |
| Comparative Example 27A | comparative oil 8A | separated throughout the whole range | separated throughout the whole range | 114 solidified at room temperature |

TABLE 6-continued

Refrigerant R-32/large refrigerated facility or air conditioner
(as refrigeration oil having kinematic viscosity at 40° C. of 100-320 mm²/s)

| | | Properties | | |
|---|---|---|---|---|
| Example Comparative Example No. | Oil No. | High-temperature-side two-layer separation temperature ° C. | Low-temperature-side two-layer separation temperature ° C. | Kinematic viscosity (40° C.) mm²/s |
| Comparative Example 28A | comparative oil 9A | Separated throughout the whole range | separated throughout the whole range | 228 |
| Comparative Example 29A | comparative oil 10A | Separated throughout the whole range | separated throughout the whole range | 116 |
| Comparative Example 30A | comparative oil 16A | separated throughout the whole range | Separated throughout the whole range | 226 |

TABLE 7

Refrigerant R-32/small refrigerated facility
(as refrigeration oil having kinematic viscosity at 40° C. of 22-50 mm²/s)

| | | Properties | | |
|---|---|---|---|---|
| Example Comparative Example No. | Oil No. | High-temperature-side two-layer separation temperature ° C. | Low-temperature-side two-layer separation temperature ° C. | Kinematic viscosity (40° C.) mm²/s |
| Example 61A | synthetic oil 26A | +66 | −8 | 27.8 |
| Example 62A | synthetic oil 27A | +70 or higher | −30 | 24.8 |
| Example 63A | synthetic oil 28A | +63 | −5 | 42.7 |
| Example 64A | synthetic oil 29A | +70 or higher | −50 or lower | 25.7 |
| Example 65A | synthetic oil 30A | +70 or higher | −48 | 29.4 |
| Example 66A | synthetic oil 31A | +70 or higher | −14 | 36.8 |
| Example 67A | synthetic oil 32A | +70 or higher | −50 or lower | 47.2 |
| Example 68A | synthetic oil 33A | +70 or higher | −41 | 37.3 |
| Example 69A | synthetic oil 34A | +70 or higher | −39 | 22.4 |
| Example 70A | synthetic oil 35A | +70 or higher | −16 | 26.0 |
| Comparative Example 31A | comparative oil 11A | separated throughout the whole range | separated throughout the whole range | 44.3 |
| Comparative Example 32A | comparative oil 12A | +48 | +27 | 34.1 |
| Comparative Example 33A | comparative oil 13A | +41 | +25 | 40.5 |
| Comparative Example 34A | comparative oil 14A | +44 | +32 | 36.4 |
| Comparative Example 35A | comparative oil 17A | +43 | +24 | 30.3 |
| Comparative Example 36A | comparative oil 18A | separated throughout the whole range | separated throughout the whole range | 33.8 |
| Comparative Example 37A | comparative oil 19A | separated throughout the whole range | separated throughout the whole range | 32.4 |

Test Example 3A: With Respect to Solubility with R-410A and Kinematic Viscosity

The high-temperature-side two-layer separation temperature and the low-temperature-side two-layer separation temperature were measured in the same manners as in Test Example 1A, except that R-410A was used as a hydrofluorocarbon-based refrigerant. The results of the measurements and the kinematic viscosities are both shown in Table 8 and Table 9.

TABLE 8

Refrigerant R-410A/air conditioner
(as refrigeration oil having kinematic viscosity at 40° C. of 50-100 mm$^2$/s)

| Example Comparative Example No. | Oil No. | High-temperature-side two-layer separation temperature ° C. | Low-temperature-side two-layer separation temperature ° C. | Kinematic viscosity (40° C.) mm$^2$/s |
|---|---|---|---|---|
| Example 71A | synthetic oil 1A | +51 | −35 | 69.7 |
| Example 72A | synthetic oil 2A | +60 | −50 | 66.9 |
| Example 73A | synthetic oil 3A | +65 | −50 or lower | 66.0 |
| Example 74A | synthetic oil 4A | +70 or higher | −50 | 64.5 |
| Example 75A | synthetic oil 5A | +54 | −41 | 97.8 |
| Example 76A | synthetic oil 6A | +53 | −39 | 75.1 |
| Example 77A | synthetic oil 7A | +64 | −50 or lower | 60.0 |
| Example 78A | synthetic oil 8A | +70 or higher | −50 or lower | 66.1 |
| Example 79A | synthetic oil 9A | +59 | −42 | 64.4 |
| Example 80A | synthetic oil 10A | +66 | −50 or lower | 62.5 |
| Example 81A | synthetic oil 11A | +52 | −50 or lower | 67.1 |
| Example 82A | synthetic oil 12A | +48 | −50 or lower | 69.0 |
| Example 83A | synthetic oil 13A | +59 | −50 or lower | 61.8 |
| Example 84A | synthetic oil 14A | +57 | −31 | 53.9 |
| Example 85A | synthetic oil 15A | +52 | −22 | 70.0 |
| Comparative Example 38A | comparative oil 3A | separated throughout the whole range | separated throughout the whole range | 88.0 |
| Comparative Example 39A | comparative oil 5A | +64 | −50 or lower | 54.0 solidified at room temperature |
| Comparative Example 40A | comparative oil 6A | separated throughout the whole range | separated throughout the whole range | 70.4 |

TABLE 9

Refrigerant R-410A/large refrigerated facility or air conditioner
(as refrigeration oil having kinematic viscosity at 40° C. of 100-320 mm$^2$/s)

| Example Comparative Example No. | Oil No. | High-temperature-side two-layer separation temperature ° C. | Low-temperature-side two-layer separation temperature ° C. | Kinematic viscosity (40° C.) mm$^2$/s |
|---|---|---|---|---|
| Example 86A | synthetic oil 16A | +47 | −35 | 140 |
| Example 87A | synthetic oil 17A | +70 or higher | −50 or lower | 139 |
| Example 88A | synthetic oil 18A | +70 or higher | −50 or lower | 141 |
| Example 89A | synthetic oil 19A | +70 or higher | −50 or lower | 124 |
| Example 90A | synthetic oil 20A | +58 | −43 | 108 |
| Example 91A | synthetic oil 21A | +53 | −41 | 149 |
| Example 92A | synthetic oil 22A | +50 | −32 | 196 |
| Example 93A | synthetic oil 23A | +70 or higher | −50 or lower | 164 |
| Example 94A | synthetic oil 24A | +52 | −50 or lower | 225 |
| Example 95A | synthetic oil 25A | +43 | −25 | 276 |
| Comparative Example 41A | comparative oil 7A | separated throughout the whole range | separated throughout the whole range | 181 |
| Comparative Example 42A | comparative oil 8A | +27 | +7 | 114 solidified at room temperature |
| Comparative Example 43A | comparative oil 9A | separated throughout the whole range | separated throughout the whole range | 228 |
| Comparative Example 44A | comparative oil 10A | separated throughout the whole range | separated throughout the whole range | 116 |

Test Example 4A: With Respect to Solubility with HFO-1234yf and Kinematic Viscosity The high-temperature-side two-layer separation temperature and the low-temperature-side two-layer separation temperature were measured in the same manners as in Test Example 1A, except that HFO-1234yf was used as a hydrofluorocarbon-based refrigerant. The results of the measurements and the kinematic viscosities are both shown in Table 10 to Table 12.

TABLE 10

Refrigerant HFO-1234yf/air conditioner
(as refrigeration oil having kinematic viscosity at 40° C. of 50-100 mm$^2$/s)

| Example Comparative Example No. | Oil No. | High-temperature-side two-layer separation temperature ° C. | Low-temperature-side two-layer separation temperature ° C. | Kinematic viscosity (40° C.) mm$^2$/s |
|---|---|---|---|---|
| Example 96A | synthetic oil 1A | +70 or higher | −50 or lower | 69.7 |
| Example 97A | synthetic oil 2A | +70 or higher | −50 or lower | 66.9 |
| Example 98A | synthetic oil 3A | +70 or higher | −50 or lower | 66.0 |
| Example 99A | synthetic oil 4A | +70 or higher | −50 or lower | 64.5 |
| Example 100A | synthetic oil 5A | +70 or higher | −50 or lower | 97.8 |
| Example 101A | synthetic oil 6A | +70 or higher | −50 or lower | 75.1 |
| Example 102A | synthetic oil 7A | +70 or higher | −50 or lower | 60.0 |
| Example 103A | synthetic oil 8A | +70 or higher | −50 or lower | 66.1 |
| Example 104A | synthetic oil 9A | +70 or higher | −50 or lower | 64.4 |
| Example 105A | synthetic oil 10A | +70 or higher | −50 or lower | 62.5 |
| Example 106A | synthetic oil 11A | +70 or higher | −50 or lower | 67.1 |
| Example 107A | synthetic oil 12A | +70 or higher | −50 or lower | 69.0 |
| Example 108A | synthetic oil 13A | +70 or higher | −50 or lower | 61.8 |
| Example 109A | synthetic oil 14A | +70 or higher | −50 or lower | 53.9 |
| Example 110A | synthetic oil 15A | +70 or higher | −50 or lower | 70.0 |
| Comparative Example 45A | comparative oil 4A | +70 or higher | −50 or lower | 53.0 solidified at room temperature |
| Comparative Example 46A | comparative oil 5A | +70 or higher | −50 or lower | 54.0 solidified at room temperature |

TABLE 11

Refrigerant HFO-1234yf/large refrigerated facility or air conditioner
(as refrigeration oil having kinematic viscosity at 40° C. of 100-320 mm$^2$/s)

| Example Comparative Example No. | Oil No. | High-temperature-side two-layer separation temperature ° C. | Low-temperature-side two-layer separation temperature ° C. | Kinematic viscosity (40° C.) mm$^2$/s |
|---|---|---|---|---|
| Example 111A | synthetic oil 16A | +70 or higher | −50 or lower | 140 |
| Example 112A | synthetic oil 17A | +70 or higher | −50 or lower | 139 |
| Example 113A | synthetic oil 18A | +70 or higher | −50 or lower | 141 |
| Example 114A | synthetic oil 19A | +70 or higher | −50 or lower | 124 |
| Example 115A | synthetic oil 20A | +70 or higher | −50 or lower | 108 |
| Example 116A | synthetic oil 21A | +70 or higher | −50 or lower | 149 |
| Example 117A | synthetic oil 22A | +70 or higher | −50 or lower | 196 |
| Example 118A | synthetic oil 23A | +70 or higher | −50 or lower | 164 |
| Example 119A | synthetic oil 24A | +70 or higher | −50 or lower | 225 |
| Example 120A | synthetic oil 25A | +70 or higher | −50 or lower | 276 |
| Comparative Example 47A | comparative oil 8A | separated throughout the whole range | separated throughout the whole range | 114 solidified at room temperature |

TABLE 12

Refrigerant HFO-1234yf/small refrigerated facility
(as refrigeration oil having kinematic viscosity at 40° C. of 22-50 mm²/s)

| Example Comparative Example No. | Oil No. | High-temperature-side two-layer separation temperature ° C. | Low-temperature-side two-layer separation temperature ° C. | Kinematic viscosity (40° C.) mm²/s |
|---|---|---|---|---|
| Example 121A | synthetic oil 26A | +70 or higher | −50 or lower | 27.8 |
| Example 122A | synthetic oil 27A | +70 or higher | −50 or lower | 24.8 |
| Example 123A | synthetic oil 28A | +70 or higher | −50 or lower | 42.7 |
| Example 124A | synthetic oil 29A | +70 or higher | −50 or lower | 25.7 |
| Example 125A | synthetic oil 30A | +70 or higher | −50 or lower | 29.4 |
| Example 126A | synthetic oil 31A | +70 or higher | −50 or lower | 36.8 |
| Example 127A | synthetic oil 32A | +70 or higher | −50 or lower | 47.2 |
| Example 128A | synthetic oil 33A | +70 or higher | −50 or lower | 37.3 |
| Example 129A | synthetic oil 34A | +70 or higher | −50 or lower | 22.4 |
| Example 130A | synthetic oil 35A | +70 or higher | −50 or lower | 26.0 |
| Comparative Example 48A | comparative oil 11A | +70 or higher | −50 or lower | 17.2 |
| Comparative Example 49A | comparative oil 12A | +70 or higher | −50 or lower | 19.7 |
| Comparative Example 50A | comparative oil 13A | +70 or higher | −50 or lower | 18.8 |

Test Example 5A: With Respect to Solubility with HFO-1234ze(E) and Kinematic Viscosity The high-temperature-side two-layer separation temperature and the low-temperature-side two-layer separation temperature were measured in the same manners as in Test Example 1A, except that HFO-1234ze(E) was used as a hydrofluorocarbon-based refrigerant. The results of the measurements and the kinematic viscosities are both shown in Table 13 to Table 15.

TABLE 13

Refrigerant HFO-1234ze(E)/air conditioner
(as refrigeration oil having kinematic viscosity at 40° C. of 50-100 mm²/s)

| Example Comparative Example No. | Oil No. | High-temperature-side two-layer separation temperature ° C. | Low-temperature-side two-layer separation temperature ° C. | Kinematic viscosity (40° C.) mm²/s |
|---|---|---|---|---|
| Example 131A | synthetic oil 1A | +70 or higher | −50 or lower | 69.7 |
| Example 132A | synthetic oil 2A | +70 or higher | −50 or lower | 66.9 |
| Example 133A | synthetic oil 3A | +70 or higher | −50 or lower | 66.0 |
| Example 134A | synthetic oil 4A | +70 or higher | −50 or lower | 64.5 |
| Example 135A | synthetic oil 5A | +70 or higher | −50 or lower | 97.8 |
| Example 136A | synthetic oil 6A | +70 or higher | −50 or lower | 75.1 |
| Example 137A | synthetic oil 7A | +70 or higher | −50 or lower | 60.0 |
| Example 138A | synthetic oil 8A | +70 or higher | −50 or lower | 66.1 |
| Example 139A | synthetic oil 9A | +70 or higher | −50 or lower | 64.4 |
| Example 140A | synthetic oil 10A | +70 or higher | −50 or lower | 62.5 |
| Example 141A | synthetic oil 11A | +70 or higher | −50 or lower | 67.1 |
| Example 142A | synthetic oil 12A | +70 or higher | −50 or lower | 69.0 |
| Example 143A | synthetic oil 13A | +70 or higher | −50 or lower | 61.8 |
| Example 144A | synthetic oil 14A | +70 or higher | −50 or lower | 53.9 |
| Example 145A | synthetic oil 15A | +70 or higher | −50 or lower | 70.0 |
| Comparative Example 51A | comparative oil 4A | +70 or higher | −50 or lower | 53.0 solidified at room temperature |
| Comparative Example 52A | comparative oil 5A | +70 or higher | −50 or lower | 54.0 solidified at room temperature |

TABLE 14

Refrigerant HFO-1234ze(E)/large refrigerated facility or air conditioner
(as refrigeration oil having kinematic viscosity at 40° C. of 100-320 mm$^2$/s)

| Example Comparative Example No. | Oil No. | High-temperature-side two-layer separation temperature ° C. | Low-temperature-side two-layer separation temperature ° C. | Kinematic viscosity (40° C.) mm$^2$/s |
|---|---|---|---|---|
| Example 146A | synthetic oil 16A | +70 or higher | −50 or lower | 140 |
| Example 147A | synthetic oil 17A | +70 or higher | −50 or lower | 139 |
| Example 148A | synthetic oil 18A | +70 or higher | −50 or lower | 141 |
| Example 149A | synthetic oil 19A | +70 or higher | −50 or lower | 124 |
| Example 150A | synthetic oil 20A | +70 or higher | −50 or lower | 108 |
| Example 151A | synthetic oil 21A | +70 or higher | −50 or lower | 149 |
| Example 152A | synthetic oil 22A | +70 or higher | −50 or lower | 196 |
| Example 153A | synthetic oil 23A | +70 or higher | −50 or lower | 164 |
| Example 154A | synthetic oil 24A | +70 or higher | −50 or lower | 225 |
| Example 155A | synthetic oil 25A | +70 or higher | −50 or lower | 276 |
| Comparative Example 53A | comparative oil 8A | separated throughout the whole range | separated throughout the whole range | 114 solidified at room temperature |

TABLE 15

Refrigerant HFO-1234ze(E)/small refrigerated facility
(as refrigeration oil having kinematic viscosity at 40° C. of 22-50 mm$^2$/s)

| Example Comparative Example No. | Oil No. | High-temperature-side two-layer separation temperature ° C. | Low-temperature-side two-layer separation temperature ° C. | Kinematic viscosity (40° C.) mm$^2$/s |
|---|---|---|---|---|
| Example 156A | synthetic oil 26A | +70 or higher | −50 or lower | 27.8 |
| Example 157A | synthetic oil 27A | +70 or higher | −50 or lower | 24.8 |
| Example 158A | synthetic oil 28A | +70 or higher | −50 or lower | 42.7 |
| Example 159A | synthetic oil 29A | +70 or higher | −50 or lower | 25.7 |
| Example 160A | synthetic oil 30A | +70 or higher | −50 or lower | 29.4 |
| Example 161A | synthetic oil 31A | +70 or higher | −50 or lower | 36.8 |
| Example 162A | synthetic oil 32A | +70 or higher | −50 or lower | 47.2 |
| Example 163A | synthetic oil 33A | +70 or higher | −50 or lower | 37.3 |
| Example 164A | synthetic oil 34A | +70 or higher | −50 or lower | 22.4 |
| Example 165A | synthetic oil 35A | +70 or higher | −50 or lower | 26.0 |
| Comparative Example 54A | comparative oil 11A | +70 or higher | −50 or lower | 17.2 |
| Comparative Example 55A | comparative oil 12A | +70 or higher | −50 or lower | 19.7 |
| Comparative Example 56A | comparative oil 13A | +70 or higher | −50 or lower | 18.8 |

Test Example 6A: With Respect to Lubricity of Refrigeration Oils

Examples 1A, 2A, 3A, 4A, and 8A and Comparative Example 1A, which is a current refrigeration oil for R-410A air conditioners, were evaluated with a Falex tester. The results thereof are shown in Table 16.

(Test Conditions)
Test apparatus: Falex tester (PIN-VEE BLOCK)
Test temperature: 80° C.
Test load: 150 lbs
Test period: 4 hr
Rotation speed: 290 rpm

TABLE 16

| | Example/Comparative Example No. | | | | | |
|---|---|---|---|---|---|---|
| | Example 166A | Example 167A | Example 168A | Example 169A | Example 170A | Comparative Example 57A |
| Oil No. | synthetic oil 1A | synthetic oil 2A | synthetic oil 3A | synthetic oil 4A | synthetic oil 8A | comparative oil 1A |

TABLE 16-continued

| | Example 166A | Example 167A | Example 168A | Example 169A | Example 170A | Comparative Example 57A |
|---|---|---|---|---|---|---|
| 2EHx molar ratio | 1 | 0.5 | 0.32 | 0.15 | 0 | 0.52 |
| DiPE molar ratio | 0.34 | 0.44 | 0.46 | 0.45 | 0.5 | 0 |
| Average molecular weight | 766 | 700 | 670 | 632 | 615 | 668 |
| Wear ratio (Comparative Example 1A (current oil) being taken as 1) | 0.61 | 0.92 | 0.63 | 0.98 | 0.51 | 1 |

Test Example 7A: With Respect to Hygroscopicity

Example 2A and Comparative Example 1A, which is a current refrigeration oil for R-410A air conditioners, were evaluated through a hygroscopicity test. The results thereof are shown in Table 17.
(Test Conditions)
Test apparatus: A hygroscopicity tester based on a combination of a humidifier, acrylic case, turntable, fan, heater, hygrometer, and thermometer was produced and used.
Test temperature: 30° C.
Test humidity: 80% RH
Surface area of specimen: 21.2 cm$^2$

TABLE 17

| Test period, hr | Example 171A Synthetic oil 2A moisture content, ppm | Comparative Example 58A Comparative oil 1A moisture content, ppm | Example 171A/ Comparative Example 58A Moisture content ratio |
|---|---|---|---|
| 0 | 24 | 22 | 1.09 |
| 1 | 148 | 174 | 0.85 |
| 2 | 261 | 350 | 0.74 |
| 3 | 334 | 500 | 0.67 |
| 4 | 431 | 640 | 0.67 |
| 6 | 605 | 790 | 0.77 |
| 8 | 780 | 921 | 0.85 |
| 10 | 932 | 1030 | 0.90 |
| 15 | 1200 | 1180 | 1.02 |
| 26 | 1587 | 1336 | 1.19 |
| 48 | 2150 | 1459 | 1.47 |
| 72 | 2296 | 1580 | 1.52 |
| 96 | 2523 | 1622 | 1.55 |

The open time which was supposed when facility dealers handled refrigeration oils was set at 0.5 to 3 hours among the test periods shown in Table 17, and refrigeration oils were compared in the degree of moisture absorption in a range including shorter and longer periods. The results thereof are shown in FIG. 1.

Test Example 8A: With Respect to Hydrolytic Resistance

A polyol ester oil which had a moisture content of 500 ppm and to which an antioxidant and an acid scavenger had been added as additives was enclosed in a glass tube together with refrigerant R-32 and an iron wire, copper wire, or aluminum wire as a catalyst, and a heating test was conducted for 14 days in a 175° C. thermostatic chamber. After completion of the heating period, the contents were examined for appearance, color, any change in the catalyst, and precipitate. Furthermore, the polyol ester oil which had undergone the test was taken out and examined for acid value. The results thereof are shown in Table 18 and Table 19.

TABLE 18

| | Example 172A | Example 173A | Example 174A | Example 175A | Example 176A | Example 177A |
|---|---|---|---|---|---|---|
| Oil No. | synthetic oil 1A | synthetic oil 2A | synthetic oil 3A | synthetic oil 4A | synthetic oil 5A | synthetic oil 6A |
| Appearance | transparent | transparent | transparent | transparent | transparent | transparent |
| Color (ASTM) | L 0.5 | L 0.5 | L 0.5 | L 0.5 | L 0.5 | L 0.5 |
| Change of catalyst, iron | light brown | light brown | light brown | light brown | light brown | light brown |
| Change of catalyst, copper | no change | no change | no change | no change | no change | no change |
| Change of catalyst, aluminum | no change | no change | no change | no change | no change | no change |
| Precipitate | none | none | none | none | none | none |
| Acid value, mg-KOH/g | 0.04 | 0.04 | 0.04 | 0.05 | 0.04 | 0.04 |

TABLE 19

| | Example 178A | Example 179A | Example 180A | Example 181A | Comparative Example 59A | Comparative Example 60A |
|---|---|---|---|---|---|---|
| Oil No. | synthetic oil 7A | synthetic oil 8A | synthetic oil 9A | synthetic oil 10A | comparative oil 1A | comparative oil 15A |
| Appearance | transparent | transparent | transparent | transparent | transparent | transparent |
| Color (ASTM) | L 0.5 | L 0.5 | L 0.5 | L 0.5 | L 0.5 | L 0.5 |
| Change of catalyst, iron | light brown | light brown | light brown | light brown | light brown | light brown |
| Change of catalyst, copper | no change | no change | no change | no change | no change | no change |
| Change of catalyst, aluminum | no change | no change | no change | no change | no change | no change |
| Precipitate | none | none | none | none | none | none |
| Acid value, mg-KOH/g | 0.04 | 0.04 | 0.04 | 0.05 | 0.04 | 0.05 |

Note 1)
Comparative oil 1A and comparative oil 15A are in use in air conditioners where R-410A, which is a current refrigerant, is used.

Test Example 9A: With Respect to Other Properties

Density, color, flash point, pour point, kinematic viscosity, viscosity index, and total acid number, as properties required of refrigeration oils, are shown in Table 20 to Table 24 on the basis of Examples and Comparative Examples.

TABLE 20

(as refrigeration oil having kinematic viscosity at 40° C. of 50-100 mm$^2$/s)

| | Example 182A | Example 183A | Example 184A | Example 185A | Example 186A |
|---|---|---|---|---|---|
| Oil No. | synthetic oil 1A | synthetic oil 2A | synthetic oil 3A | synthetic oil 4A | synthetic oil 5A |
| Density, 15° C. g/cm$^3$ | 0.99 | 1.00 | 1.01 | 1.02 | 1.00 |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 250 or higher |
| Pour point, ° C. | −35 | −37.5 | −40 | −42.5 | −35 |
| Kinematic viscosity, 40° C. mm$^2$/s | 69.7 | 66.9 | 66.0 | 64.5 | 97.8 |
| Kinematic viscosity, 100° C. mm$^2$/s | 8.67 | 8.42 | 8.39 | 8.20 | 10.9 |
| Viscosity index | 95 | 94 | 95 | 95 | 96 |
| Moisture content, ppm | 25 | 25 | 25 | 25 | 25 |
| Total acid number, mg-KOH/g | 0.01 | 0.01 | 0.01 | 0.01 | 0.01 |

TABLE 21

(as refrigeration oil having kinematic viscosity at 40° C. of 50-100 mm$^2$/s)

| | Example 187A | Example 188A | Example 189A | Example 190A | Example 191A |
|---|---|---|---|---|---|
| Oil No. | synthetic oil 6A | synthetic oil 7A | synthetic oil 8A | synthetic oil 9A | synthetic oil 10A |
| Density, 15° C. g/cm$^3$ | 1.02 | 0.98 | 1.03 | 0.97 | 1.00 |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 250 or higher |
| Pour point, ° C. | −35 | −40 | −37.5 | −40 | −35 |
| Kinematic viscosity, 40° C. mm$^2$/s | 75.1 | 60.0 | 66.1 | 64.4 | 62.5 |

TABLE 21-continued (as refrigeration oil having kinematic viscosity at 40° C. of 50-100 mm²/s)

| | Example/Comparative Example No. | | | | |
|---|---|---|---|---|---|
| | Example 187A | Example 188A | Example 189A | Example 190A | Example 191A |
| Kinematic viscosity, 100° C. mm²/s | 9.10 | 7.76 | 8.23 | 8.20 | 7.98 |
| Viscosity index | 94 | 91 | 91 | 91 | 92 |
| Moisture content, ppm | 25 | 25 | 25 | 25 | 25 |
| Total acid number, mg-KOH/g | 0.01 | 0.01 | 0.01 | 0.01 | 0.01 |

TABLE 22

(as refrigeration oil having kinematic viscosity at 40° C. of 50-100 mm²/s)

| | Example/Comparative Example No. | | | | |
|---|---|---|---|---|---|
| | Example 192A | Example 193A | Example 194A | Example 195A | Comparative Example 61A |
| Oil No. | synthetic oil 11A | synthetic oil 12A | synthetic oil 13A | synthetic oil 15A | comparative oil 1A |
| Density, 15° C. g/cm³ | 1.03 | 1.01 | 0.98 | 1.03 | 0.959 |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 250 or higher |
| Pour point, ° C. | −47.5 | −42.5 | −42.5 | −35 | −40 |
| Kinematic viscosity, 40° C. mm²/s | 67.1 | 69.0 | 61.8 | 70.0 | 67.8 |
| Kinematic viscosity, 100° C. mm²/s | 9.88 | 9.26 | 8.71 | 6.99 | 8.34 |
| Viscosity index | 130 | 111 | 115 | 61 | 90 |
| Moisture content, ppm | 25 | 25 | 25 | 25 | 25 |
| Total acid number, mg-KOH/g | 0.01 | 0.01 | 0.01 | 0.01 | 0.01 |

Note 1)
Comparative oil 1A is a polyol ester in use in air conditioners where R-410A, which is a current refrigerant, is used.

TABLE 23

(as refrigeration oil having kinematic viscosity at 40° C. of 100-320 mm²/s)

| | Example/Comparative Example No. | | | | |
|---|---|---|---|---|---|
| | Example 196A | Example 197A | Example 198A | Example 199A | Comparative Example 62A |
| Oil No. | synthetic oil 16A | synthetic oil 17A | synthetic oil 24A | synthetic oil 25A | comparative oil 16A |
| Density, 15° C. g/cm³ | 1.01 | 1.02 | 1.00 | 0.99 | 1.02 |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 224 |
| Pour point, ° C. | −35 | −37.5 | −35 | −35 | −32.5 |
| Kinematic viscosity, 40° C. mm²/s | 140 | 139 | 225 | 276 | 226 |
| Kinematic viscosity, 100° C. mm²/s | 13.8 | 13.6 | 18.3 | 20.9 | 21.8 |
| Viscosity index | 94 | 93 | 89 | 89 | 116 |
| Moisture content, ppm | 25 | 25 | 25 | 25 | 25 |
| Total acid number, mg-KOH/g | 0.01 | 0.01 | 0.01 | 0.01 | 0.01 |

Note 1)
Comparative oil 16A is a polyol ester in use in large refrigerated facilities or air conditioners where R-410A, R-134a, and the like, which are current refrigerants, are used.

TABLE 24

(as refrigeration oil having kinematic viscosity at 40° C. of 22-50 mm²/s)

| | Example/Comparative Example No. | | | | |
|---|---|---|---|---|---|
| | Example 200A | Example 201A | Example 202A | Example 203A | Compartive Example 63A |
| Oil No. | synthetic oil 30A | synthetic oil 31A | synthetic oil 32A | synthetic oil 35A | comparative oil 17A |
| Density, 15° C. g/cm³ | 1.00 | 0.99 | 1.02 | 0.99 | 0.99 |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 250 or higher |
| Pour point, ° C. | −42.5 | −40 | −42.5 | −45 | −50 |
| Kinematic viscosity, 40° C. mm²/s | 29.4 | 36.8 | 47.3 | 26.0 | 30.3 |
| Kinematic viscosity, 100° C. mm²/s | 4.83 | 5.47 | 6.48 | 4.67 | 5.73 |
| Viscosity index | 76 | 76 | 82 | 93 | 133 |
| Moisture content, ppm | 25 | 25 | 25 | 25 | 50 |
| Total acid number, mg-KOH/g | 0.01 | 0.01 | 0.01 | 0.01 | 0.02 |

Note 1)
Comparative oil 17A is a polyol ester in use in small refrigerated facilities where R-134a, R-404A, and the like, which are current refrigerants, are used.

(List of Polyol Ester Oils for Each Raw Material Combination)

The Examples and the Comparative Examples are arranged with respect to each of raw material combinations to show that various viscosities and solubility with various refrigerants are obtained by changing the ratio of raw materials. The relationships between the raw material combination and kinematic viscosity or refrigerated facilities/air conditioners to which the oil is applicable are as shown in the following Table 25 to Table 34.

TABLE 25

Raw material combination (1): alcohols, PE and DiPE; acid 1, 2MBu; acid 2, 2EHx

| Oil No. | PE | DiPE | 2MBu | 2EHx | Kinematic viscosity (40° C.) mm²/s | Refrigerating apparatus |
|---|---|---|---|---|---|---|
| Synthetic oil 1A | 0.60 | 0.40 | 0.4 | 0.6 | 69.7 | air conditioner |
| Synthetic oil 2A | 0.55 | 0.45 | 0.5 | 0.5 | 66.9 | air conditioner |
| Synthetic oil 3A | 0.55 | 0.45 | 0.7 | 0.3 | 66.0 | air conditioner |
| Synthetic oil 4A | 0.55 | 0.45 | 0.85 | 0.15 | 64.5 | air conditioner |
| Synthetic oil 5A | 0.30 | 0.70 | 0.5 | 0.5 | 97.8 | air conditioner |
| Synthetic oil 6A | 0.55 | 0.45 | 0.45 | 0.55 | 75.1 | air conditioner |
| Synthetic oil 16A | 0.0 | 1.0 | 0.5 | 0.5 | 140 | large refrigerated facility or air conditioner |
| Synthetic oil 17A | 0.0 | 1.0 | 0.65 | 0.35 | 139 | large refrigerated facility or air conditioner |
| Synthetic oil 18A | 0.0 | 1.0 | 1.0 | 0.0 | 141 | large refrigerated facility or air conditioner |
| Synthetic oil 19A | 0.10 | 0.90 | 1.0 | 0.0 | 124 | large refrigerated facility or air conditioner |
| Synthetic oil 29A | 1.0 | 0.0 | 1.0 | 0.0 | 25.7 | small refrigerated facility |
| Synthetic oil 30A | 1.0 | 0.0 | 0.75 | 0.25 | 29.4 | small refrigerated facility |
| Synthetic oil 31A | 1.0 | 0.0 | 0.5 | 0.5 | 36.8 | small refrigerated facility |
| Synthetic oil 32A | 0.70 | 0.30 | 0.85 | 0.15 | 47.2 | small refrigerated facility |
| Comparative oil 6A | 0.65 | 0.35 | 0.0 | 1.0 | 70.4 | — |
| Comparative oil 11A | 1.0 | 0.0 | 0.0 | 1.0 | 44.3 | — |

TABLE 26

Raw material combination (2): alcohols, PE and DiPE; acid 1, 2MBu; acid 2, TMHx

| Oil No. | PE | DiPE | 2MBu | TMHx | Kinematic viscosity (40° C.) mm$^2$/s | Refrigerating apparatus |
|---|---|---|---|---|---|---|
| Synthetic oil 7A | 1.0 | 0.0 | 0.5 | 0.5 | 60.0 | air conditioner |
| Synthetic oil 8A | 0.50 | 0.50 | 1.0 | 0.0 | 66.1 | air conditioner |
| Synthetic oil 9A | 1.0 | 0.0 | 0.4 | 0.6 | 64.4 | air conditioner |
| Synthetic oil 10A | 0.85 | 0.15 | 0.6 | 0.4 | 62.5 | air conditioner |
| Synthetic oil 18A | 0.0 | 1.0 | 1.0 | 0.0 | 141 | large refrigerated facility or air conditioner |
| Synthetic oil 19A | 0.10 | 0.90 | 1.0 | 0.0 | 124 | large refrigerated facility or air conditioner |
| Synthetic oil 20A | 0.70 | 0.30 | 0.5 | 0.5 | 108 | large refrigerated facility or air conditioner |
| Synthetic oil 21A | 0.50 | 0.50 | 0.5 | 0.5 | 149 | large refrigerated facility or air conditioner |
| Synthetic oil 22A | 0.30 | 0.70 | 0.5 | 0.5 | 196 | large refrigerated facility or air conditioner |
| Synthetic oil 23A | 0.0 | 1.0 | 0.9 | 0.1 | 164 | large refrigerated facility or air conditioner |
| Synthetic oil 24A | 0.0 | 1.0 | 0.65 | 0.35 | 225 | large refrigerated facility or air conditioner |
| Synthetic oil 25A | 0.0 | 1.0 | 0.5 | 0.5 | 276 | large refrigerated facility or air conditioner |
| Synthetic oil 29A | 1.0 | 0.0 | 1.0 | 0.0 | 25.7 | small refrigerated facility |
| Synthetic oil 33A | 1.0 | 0.0 | 0.75 | 0.25 | 37.3 | small refrigerated facility |
| Comparative oil 8A | 1.0 | 0.0 | 0.0 | 1.0 | 114 solidified at room temperature | — |

TABLE 27

Raw material combination (3): alcohols, PE and DiPE; acid 1, LPt; acid 2, 2EHx

| Oil No. | PE | DiPE | LPt | 2EHx | Kinematic viscosity (40° C.) mm$^2$/s | Refrigerating apparatus |
|---|---|---|---|---|---|---|
| Synthetic oil 26A | 1.0 | 0.0 | 0.5 | 0.5 | 27.8 | small refrigerated facility |
| Comparative oil 6A | 0.65 | 0.35 | 0.0 | 1.0 | 70.4 | — |
| Comparative oil 11A | 1.0 | 0.0 | 0.0 | 1.0 | 44.3 | — |
| Comparative oil 12A | 1.0 | 0.0 | 0.25 | 0.75 | 34.1 | — |

TABLE 28

Raw material combination (4): alcohols, PE and DiPE; acid 1, LPt; acid 2, TMHx

| Oil No. | PE | DiPE | LPt | TMHx | Kinematic viscosity (40° C.) mm$^2$/s | Refrigerating apparatus |
|---|---|---|---|---|---|---|
| Synthetic oil 11A | 0.0 | 1.0 | 0.8 | 0.2 | 67.1 | air conditioner |
| Synthetic oil 27A | 1.0 | 0.0 | 0.75 | 0.25 | 24.8 | small refrigerated facility |
| Synthetic oil 28A | 1.0 | 0.0 | 0.5 | 0.5 | 42.7 | small refrigerated facility |
| Comparative oil 8A | 1.0 | 0.0 | 0.0 | 1.0 | 114 solidified at room temperature | — |

TABLE 29

Raw material combination (5): alcohols, PE and DiPE; acid 1, 2MPt; acid 2, 2EHx

| Oil No. | PE | DiPE | 2MPt | 2EHx | Kinematic viscosity (40° C.) mm$^2$/s | Refrigerating apparatus |
|---|---|---|---|---|---|---|
| Synthetic oil 12A | 0.25 | 0.75 | 0.8 | 0.2 | 69.0 | air conditioner |
| Synthetic oil 13A | 0.25 | 0.75 | 1.0 | 0.0 | 61.8 | air conditioner |
| Synthetic oil 34A | 1.0 | 0.0 | 1.0 | 0.0 | 22.4 | small refrigerated facility |
| Synthetic oil 35A | 1.0 | 0.0 | 0.75 | 0.25 | 26.0 | small refrigerated facility |

TABLE 29-continued

Raw material combination (5): alcohols, PE and DiPE;
acid 1, 2MPt; acid 2, 2EHx

| Oil No. | PE | DiPE | 2MPt | 2EHx | Kinematic viscosity (40° C.) mm$^2$/s | Refrigerating apparatus |
|---|---|---|---|---|---|---|
| Comparative oil 6A | 0.65 | 0.35 | 0.0 | 1.0 | 70.4 | — |
| Comparative oil 10A | 0.0 | 1.0 | 0.35 | 0.65 | 116 | — |
| Comparative oil 11A | 1.0 | 0.0 | 0.0 | 1.0 | 44.3 | — |
| Comparative oil 14A | 1.0 | 0.0 | 0.25 | 0.75 | 36.4 | — |

TABLE 30

Raw material combination (6): alcohols, PE and DiPE;
acid 1, 2MPt; acid 2, TMHx

| Oil No. | PE | DiPE | 2MPt | TMHx | Kinematic viscosity (40° C.) mm$^2$/s | Refrigerating apparatus |
|---|---|---|---|---|---|---|
| Synthetic oil 13A | 0.25 | 0.75 | 1.0 | 0.0 | 61.8 | air conditioner |
| Synthetic oil 14A | 1.0 | 0.0 | 0.5 | 0.5 | 53.9 | air conditioner |
| Synthetic oil 34A | 1.0 | 0.0 | 1.0 | 0.0 | 22.4 | small refrigerated facility |
| Comparative oil 8A | 1.0 | 0.0 | 0.0 | 1.0 | 114 solidified at room temperature | — |

TABLE 31

Raw material combination (7): alcohols, PE and DiPE;
acid 1, 2EBu; acid 2, TMHx

| Oil No. | PE | DiPE | 2EBu | TMHx | Kinematic viscosity (40° C.) mm$^2$/s | Refrigerating apparatus |
|---|---|---|---|---|---|---|
| Synthetic oil 15A | 1.0 | 0.0 | 0.75 | 0.25 | 70.0 | air conditioner |
| Comparative oil 8A | 1.0 | 0.0 | 0.0 | 1.0 | 114 solidified at room temperature | — |

TABLE 32

Raw material combination (8): alcohols, PE and DiPE;
acid 1, LHx; acid 2, TMHx

| Oil No. | PE | DiPE | LHx | TMHx | Kinematic viscosity (40° C.) mm$^2$/s | Refrigerating apparatus |
|---|---|---|---|---|---|---|
| Comparative oil 2A | 1.0 | 0.0 | 0.25 | 0.75 | 64.6 | — |
| Comparative oil 3A | 0.0 | 1.0 | 0.65 | 0.35 | 88.0 | — |
| Comparative oil 4A | 0.0 | 1.0 | 1.0 | 0.0 | 53.0 solidified at room temperature | — |
| Comparative oil 7A | 0.0 | 1.0 | 0.35 | 0.65 | 181 | — |
| Comparative oil 8A | 1.0 | 0.0 | 0.0 | 1.0 | 114 solidified at room temperature | — |
| Comparative oil 13A | 1.0 | 0.0 | 0.5 | 0.5 | 40.5 | — |

TABLE 33

Raw material combination (9): alcohols, PE and DiPE;
acid 1, 2EHx; acid 2, TMHx

| Oil No. | PE | DiPE | 2EHx | TMHx | Kinematic viscosity (40° C.) mm$^2$/s | Refrigerating apparatus |
|---|---|---|---|---|---|---|
| Comparative oil 1A | 1.0 | 0.0 | 0.5 | 0.5 | 67.8 | air conditioner |
| Comparative oil 6A | 0.65 | 0.35 | 1.0 | 0.0 | 70.4 | — |
| Comparative oil 8A | 1.0 | 0.0 | 0.0 | 1.0 | 114 solidified at room temperature | — |
| Comparative oil 9A | 0.0 | 1.0 | 0.5 | 0.5 | 228 | — |
| Comparative oil 11A | 1.0 | 0.0 | 1.0 | 0.0 | 44.3 | — |

TABLE 34

Other combinations (conventional refrigeration oils)

| Oil No. | PE | DiPE | Acids | Kinematic viscosity (40° C.) mm$^2$/s | Refrigerating apparatus |
|---|---|---|---|---|---|
| Comparative oil 17A | 0.8 | 0.2 | LPt: 0.4 n-heptanoic acid: 0.4 MHx: 0.2 | 30.3 | small refrigerated facility |
| Comparative oil 15A | | | refrigerant R-410A/ether oil for air conditioner | 64.7 | air conditioner |
| Comparative oil 16A | | | complex ester obtained from PE, 2EHx, adipic acid, etc. | 226 | large refrigerated facility or air conditioner |
| Refrigerating machine oil A | | | Alcohol: neopentyl glycol Fatty acid: 2EHx | 7.56 | domestic refrigerator |

The relationship between each raw material combination and the solubility with each refrigerant (low-temperature-side two-layer separation temperature) is as shown in the following Table 35 to Table 44.

TABLE 35

Alcohols, PE and DiPE; acid 1, 2MBu; acid 2, 2EHx

| Oil No. | PE | DiPE | 2MBu | 2EHx | Low-temperature-side two-layer separation temperature (oil content, 20%), ° C. | | |
|---|---|---|---|---|---|---|---|
| | | | | | R-32 | R-410A | HFO-1234ze(E) |
| Synthetic oil 1A | 0.60 | 0.40 | 0.4 | 0.6 | +16 | −35 | −50 or lower |
| Synthetic oil 2A | 0.55 | 0.45 | 0.5 | 0.5 | −6 | −50 | −50 or lower |
| Synthetic oil 3A | 0.55 | 0.45 | 0.7 | 0.3 | −30 | −50 or lower | −50 or lower |
| Synthetic oil 4A | 0.55 | 0.45 | 0.85 | 0.15 | −50 | −50 | −50 or lower |
| Synthetic oil 5A | 0.30 | 0.70 | 0.5 | 0.5 | +4 | −41 | −50 or lower |
| Synthetic oil 6A | 0.55 | 0.45 | 0.45 | 0.55 | +9 | −39 | −50 or lower |
| Synthetic oil 16A | 0.0 | 1.0 | 0.5 | 0.5 | +10 | −35 | −50 or lower |
| Synthetic oil 17A | 0.0 | 1.0 | 0.65 | 0.35 | −14 | −50 or lower | −50 or lower |
| Synthetic oil 18A | 0.0 | 1.0 | 1.0 | 0.0 | −50 or lower | −50 or lower | −50 or lower |
| Synthetic oil 19A | 0.10 | 0.90 | 1.0 | 0.0 | −50 or lower | −50 or lower | −50 or lower |
| Synthetic oil 29A | 1.0 | 0.0 | 1.0 | 0.0 | −50 or lower | −50 or lower | −50 or lower |
| Synthetic oil 30A | 1.0 | 0.0 | 0.75 | 0.25 | −48 | −50 or lower | −50 or lower |
| Synthetic oil 31A | 1.0 | 0.0 | 0.5 | 0.5 | −14 | −50 or lower | −50 or lower |
| Synthetic oil 32A | 0.70 | 0.30 | 0.85 | 0.15 | −50 or lower | −50 or lower | −50 or lower |
| Comparative oil 6A | 0.65 | 0.35 | 0.0 | 1.0 | separated throughout the whole range | separated throughout the whole range | −50 or lower |
| Comparative oil 11A | 1.0 | 0.0 | 0.0 | 1.0 | separated throughout the whole range | +17 | −50 or lower |

TABLE 36

Alcohols, PE and DiPE; acid 1, 2MBu; acid 2, TMHx

| Oil No. | PE | DiPE | 2MBu | TMHx | Low-temperature-side two-layer separation temperature (oil content, 20%), ° C. | | |
|---|---|---|---|---|---|---|---|
| | | | | | R-32 | R-410A | HFO-1234ze(E) |
| Synthetic oil 7A | 1.0 | 0.0 | 0.5 | 0.5 | −13 | −50 or lower | −50 or lower |
| Synthetic oil 8A | 0.50 | 0.50 | 1.0 | 0.0 | −50 or lower | −50 or lower | −50 or lower |
| Synthetic oil 9A | 1.0 | 0.0 | 0.4 | 0.6 | −2 | −42 | −50 or lower |
| Synthetic oil 10A | 0.85 | 0.15 | 0.6 | 0.4 | −24 | −50 or lower | −50 or lower |
| Synthetic oil 18A | 0.0 | 1.0 | 1.0 | 0.0 | −50 or lower | −50 or lower | −50 or lower |
| Synthetic oil 19A | 0.10 | 0.90 | 1.0 | 0.0 | −50 or lower | −50 or lower | −50 or lower |
| Synthetic oil 20A | 0.70 | 0.30 | 0.5 | 0.5 | −3 | −43 | −50 or lower |
| Synthetic oil 21A | 0.50 | 0.50 | 0.5 | 0.5 | −1 | −41 | −50 or lower |
| Synthetic oil 22A | 0.30 | 0.70 | 0.5 | 0.5 | +8 | −32 | −50 or lower |
| Synthetic oil 23A | 0.0 | 1.0 | 0.9 | 0.1 | −50 or lower | −50 or lower | −50 or lower |

TABLE 36-continued

Alcohols, PE and DiPE; acid 1, 2MBu; acid 2, TMHx

| Oil No. | PE | DiPE | 2MBu | TMHx | R-32 | R-410A | HFO-1234ze(E) |
|---|---|---|---|---|---|---|---|
| Synthetic oil 24A | 0.0 | 1.0 | 0.65 | 0.35 | −2 | −50 or lower | −50 or lower |
| Synthetic oil 25A | 0.0 | 1.0 | 0.5 | 0.5 | +15 | −25 | −50 or lower |
| Synthetic oil 29A | 1.0 | 0.0 | 1.0 | 0.0 | −50 or lower | −50 or lower | −50 or lower |
| Synthetic oil 33A | 1.0 | 0.0 | 0.75 | 0.25 | −30 | −50 or lower | −50 or lower |
| Comparative oil 8A | 1.0 | 0.0 | 0.0 | 1.0 | separated throughout the whole range | +7 | −50 or lower |

Low-temperature-side two-layer separation temperature (oil content, 20%), °C.

TABLE 37

Alcohols, PE and DiPE; acid 1, LPt; acid 2, 2EHx

| Oil No. | PE | DiPE | LPt | 2EHx | R-32 | R-410A | HFO-1234ze(E) |
|---|---|---|---|---|---|---|---|
| Synthetic oil 26A | 1.0 | 0.0 | 0.5 | 0.5 | −8 | −49 | −50 or lower |
| Comparative oil 6A | 0.65 | 0.35 | 0.0 | 1.0 | separated throughout the whole range | separated throughout the whole range | −50 or lower |
| Comparative oil 11A | 1.0 | 0.0 | 0.0 | 1.0 | separated throughout the whole range | +17 | −50 or lower |
| Comparative oil 12A | 1.0 | 0.0 | 0.25 | 0.75 | +27 | −20 | −50 or lower |

Low-temperature-side two-layer separation temperature (oil content, 20%), °C.

TABLE 38

Alcohols, PE and DiPE; acid 1, LPt; acid 2, TMHx

| Oil No. | PE | DiPE | LPt | TMHx | R-32 | R-410A | HFO-1234ze(E) |
|---|---|---|---|---|---|---|---|
| Synthetic oil 11A | 0.0 | 1.0 | 0.8 | 0.2 | −12 | −50 or lower | −50 or lower |
| Synthetic oil 27A | 1.0 | 0.0 | 0.75 | 0.25 | −30 | −50 or lower | −50 or lower |
| Synthetic oil 28A | 1.0 | 0.0 | 0.5 | 0.5 | −5 | −44 | −50 or lower |
| Comparative oil 8A | 1.0 | 0.0 | 0.0 | 1.0 | separated throughout the whole range | +7 | −50 or lower |

Low-temperature-side two-layer separation temperature (oil content, 20%), °C.

TABLE 39

Alcohols, PE and DiPE; acid 1, 2MPt; acid 2, 2EHx

| Oil No. | PE | DiPE | 2MPt | 2EHx | Low-temperature-side two-layer separation temperature (oil content, 20%), °C. | | |
|---|---|---|---|---|---|---|---|
| | | | | | R-32 | R-410A | HFO-1234ze(E) |
| Synthetic oil 12A | 0.25 | 0.75 | 0.8 | 0.2 | −1 | −50 or lower | −50 or lower |
| Synthetic oil 13A | 0.25 | 0.75 | 1.0 | 0.0 | −18 | −50 or lower | −50 or lower |
| Synthetic oil 34A | 1.0 | 0.0 | 1.0 | 0.0 | −34 | −50 or lower | −50 or lower |
| Synthetic oil 35A | 1.0 | 0.0 | 0.75 | 0.25 | −16 | −50 or lower | −50 or lower |
| Comparative oil 6A | 0.65 | 0.35 | 0.0 | 1.0 | separated throughout the whole range | Separated throughout the whole range | −50 or lower |
| Comparative oil 10A | 0.0 | 1.0 | 0.35 | 0.65 | separated throughout the whole range | separated throughout the whole range | −50 or lower |
| Comparative oil 11A | 1.0 | 0.0 | 0.0 | 1.0 | separated throughout the whole range | +17 | −50 or lower |
| Comparative oil 14A | 1.0 | 0.0 | 0.25 | 0.75 | +32 | −19 | −50 or lower |

TABLE 40

Alcohols, PE and DiPE; acid 1, 2MPt; acid 2, TMHx

| Oil No. | PE | DiPE | 2MPt | 2EHx | Low-temperature-side two-layer separation temperature (oil content, 20%), °C. | | |
|---|---|---|---|---|---|---|---|
| | | | | | R-32 | R-410A | HFO-1234ze(E) |
| Synthetic oil 13A | 0.25 | 0.75 | 1.0 | 0.0 | −18 | −50 or lower | −50 or lower |
| Synthetic oil 14A | 1.0 | 0.0 | 0.5 | 0.5 | +7 | −31 | −50 or lower |
| Synthetic oil 34A | 1.0 | 0.0 | 1.0 | 0.0 | −34 | −50 or lower | −50 or lower |
| Comparative oil 8A | 1.0 | 0.0 | 0.0 | 1.0 | separated throughout the whole range | +7 | −50 or lower |

TABLE 41

Alcohols, PE and DiPE; acid 1, 2EBu; acid 2, TMHx

| Oil No. | PE | DiPE | 2EBu | TMHx | Low-temperature-side two-layer separation temperature (oil content, 20%), °C. | | |
|---|---|---|---|---|---|---|---|
| | | | | | R-32 | R-410A | HFO-1234ze(E) |
| Synthetic oil 15A | 1.0 | 0.0 | 0.75 | 0.25 | +10 | −22 | −50 or lower |
| Comparative oil 8A | 1.0 | 0.0 | 0.0 | 1.0 | separated throughout the whole range | +7 | −50 or lower |

TABLE 42

Alcohols, PE and DiPE; acid 1, LHx; acid 2, TMHx

| Oil No. | PE | DiPE | LHx | TMHx | Low-temperature-side two-layer separation temperature (oil content, 20%), °C. | | |
|---|---|---|---|---|---|---|---|
| | | | | | R-32 | R-410A | HFO-1234ze(E) |
| Comparative oil 2A | 1.0 | 0.0 | 0.25 | 0.75 | separated throughout the whole range | −8 | −50 or lower |
| Comparative oil 3A | 0.0 | 1.0 | 0.65 | 0.35 | separated throughout the whole range | separated throughout the whole range | −50 or lower |
| Comparative oil 7A | 0.0 | 1.0 | 0.35 | 0.65 | separated throughout the whole range | separated throughout the whole range | −50 or lower |
| Comparative oil 8A | 1.0 | 0.0 | 0.0 | 1.0 | separated throughout the whole range | +7 | −50 or lower |
| Comparative oil 13A | 1.0 | 0.0 | 0.5 | 0.5 | +25 | −19 | −50 or lower |

TABLE 43

Alcohols, PE and DiPE; acid 1, 2EHx; acid 2, TMHx

| Oil No. | PE | DiPE | 2EHx | TMHx | Low-temperature-side two-layer separation temperature (oil content, 20%), °C. | | |
|---|---|---|---|---|---|---|---|
| | | | | | R-32 | R-410A | HFO-1234ze(E) |
| Comparative oil 1A | 1.0 | 0.0 | 0.5 | 0.5 | separated throughout the whole range | +8 | −50 or lower |
| Comparative oil 6A | 0.65 | 0.35 | 1.0 | 0.0 | separated throughout the whole range | separated throughout the whole range | −50 or lower |
| Comparative oil 8A | 1.0 | 0.0 | 0.0 | 1.0 | separated throughout the whole range | +7 | −50 or lower |
| Comparative oil 9A | 0.0 | 1.0 | 0.5 | 0.5 | separated throughout the whole range | separated throughout the whole range | −50 or lower |
| Comparative oil 11A | 1.0 | 0.0 | 1.0 | 0.0 | separated throughout the whole range | +17 | −50 or lower |

TABLE 44

Other combinations

| Oil No. | PE | DiPE | Acids | Low-temperature-side two-layer separation temperature (oil content, 20%), °C. | | |
|---|---|---|---|---|---|---|
| | | | | R-32 | R-410A | HFO-1234ze(E) |
| Comparative oil 17A | 0.8 | 0.2 | LPt: 0.4 n-heptanoic acid: 0.4 TMHx: 0.2 | +24 | −23 | −50 or lower |

TABLE 44-continued

Other combinations

| | | | Low-temperature-side two-layer separation temperature (oil content, 20%), ° C. | | |
|---|---|---|---|---|---|
| Oil No. | PE | DiPE Acids | R-32 | R-410A | HFO-1234ze(E) |
| Comparative oil 15A | refrigerant R-410A/ether oil for air conditioner | | separated throughout the whole range | −51 | −50 or lower |
| Comparative oil 16A | complex ester obtained from PE, 2EHx, adipic acid, etc. | | Separated throughout | −44 | −50 or lower |
| Refrigerating machine oil A | Alcohol: neopentyl glycol Fatty acid: 2EHx | | −20 | −50 or lower | −50 or lower |

As shown in Table 23 to Table 32, the polyol ester oils each produced by esterifying an alcohol ingredient obtained by mixing pentaerythritol with dipentaerythritol and a fatty acid ingredient composed of at least one of pentanoic acid and hexanoic acid and at least one of octanoic acid and nonanoic acid are made to have various values of viscosity by changing the proportions of the raw materials with respect to each of specific raw material combinations.

Furthermore, as shown in Test Examples 1A to 4A and Table 33 to Table 42, refrigeration oil compositions which are excellent in terms of solubility and lubricity can be produced by using polyol ester oils each produced by esterifying an alcohol ingredient obtained by mixing pentaerythritol with dipentaerythritol and a fatty acid ingredient composed of at least one of pentanoic acid and hexanoic acid and at least one of octanoic acid and nonanoic acid, in accordance with the kinds of hydrofluorocarbon-based refrigerants. Moreover, as shown in Test Examples 5A to 8A, the polyol ester oils produced are equal or superior to conventional refrigeration oils in other performances and, by incorporating additives thereinto as in conventional products, the polyol ester oils can be rendered usable also in refrigerated facilities employing refrigerants having a low global warming potential, such as refrigerant R-32, as in apparatus in which R-410A, a conventional refrigerant, is used.

<Test B: Refrigeration Oil Compositions for Hydrocarbon-Based Refrigerants>

The alcohol ingredients and fatty acid ingredients shown in Table B were esterified to produce polyol ester oils. In the table, PE represents pentaerythritol, DiPE represents dipentaerythritol, LPt represents normal pentanoic acid (a pentanoic acid), 2 MBu represents DL-2-methylbutanoic acid (a pentanoic acid), LHx represents normal hexanoic acid (a hexanoic acid), 2 MPt represents DL-2-methylpentanoic acid (a hexanoic acid), 2EBu represents 2-ethylbutanoic acid (a hexanoic acid), 2EHx represents a 2-ethylhexanoic acid (an octanoic acid), and TMHx represents 3,5,5-trimethylhexanoic acid (a nonanoic acid), and the mixing proportion of each alcohol ingredient to the fatty acid ingredient is in molar ratio. A mineral oil (comparative oil 15B) for refrigerant R-290 was also used as a comparative oil.

TABLE B (Polyol ester oils used in Examples and Comparative Examples)

| | Alcohol ingredient | | Fatty acid ingredient | |
|---|---|---|---|---|
| Oil No. | PE | DiPE | Acid 1 | Acid 2 |
| Synthetic oil 1B | 0.60 | 0.40 | 2MBu: 0.4 | 2EHx: 0.6 |
| Synthetic oil 2B | 0.55 | 0.45 | 2MBu: 0.5 | 2EHx: 0.5 |
| Synthetic oil 3B | 0.55 | 0.45 | 2MBu: 0.7 | 2EHx: 0.3 |
| Synthetic oil 4B | 0.55 | 0.45 | 2MBu: 0.85 | 2EHx: 0.15 |
| Synthetic oil 5B | 0.30 | 0.70 | 2MBu: 0.5 | 2EHx: 0.5 |
| Synthetic oil 6B | 0.55 | 0.45 | 2MBu: 0.45 | 2EHx: 0.55 |
| Synthetic oil 7B | 1.0 | 0.0 | 2MBu: 0.5 | TMHx: 0.5 |
| Synthetic oil 8B | 0.50 | 0.50 | 2MBu: 1.0 | TMHx: 0.0 |
| Synthetic oil 9B | 1.0 | 0.0 | 2MBu: 0.4 | TMHx: 0.6 |
| Synthetic oil 10B | 0.85 | 0.15 | 2MBu: 0.6 | TMHx: 0.4 |
| Synthetic oil 11B | 0.0 | 1.0 | LPt: 0.8 | TMHx: 0.2 |
| Synthetic oil 12B | 0.25 | 0.75 | 2MPt: 0.8 | 2EHx: 0.2 |
| Synthetic oil 13B | 0.25 | 0.75 | 2MPt: 1.0 | — |
| Synthetic oil 14B | 1.0 | 0.0 | 2MPt: 0.5 | TMHx: 0.5 |
| Synthetic oil 15B | 1.0 | 0.0 | 2EBu: 0.75 | TMHx: 0.25 |
| Synthetic oil 16B | 0.0 | 1.0 | 2MBu: 0.5 | 2EHx: 0.5 |
| Synthetic oil 17B | 0.0 | 1.0 | 2MBu: 0.7 | 2EHx: 0.35 |
| Synthetic oil 18B | 0.0 | 1.0 | 2MBu: 1.0 | — |
| Synthetic oil 19B | 0.10 | 0.90 | 2MBu: 1.0 | — |
| Synthetic oil 20B | 0.70 | 0.30 | 2MBu: 0.5 | TMHx: 0.5 |
| Synthetic oil 21B | 0.50 | 0.50 | 2MBu: 0.5 | TMHx: 0.5 |
| Synthetic oil 22B | 0.30 | 0.70 | 2MBu: 0.5 | TMHx: 0.5 |
| Synthetic oil 23B | 0.0 | 1.0 | 2MBu: 0.9 | TMHx: 0.1 |
| Synthetic oil 24B | 0.0 | 1.0 | 2MBu: 0.7 | TMHx: 0.3 |
| Synthetic oil 25B | 0.0 | 1.0 | 2MBu: 0.5 | TMHx: 0.5 |
| Synthetic oil 26B | 1.0 | 0.0 | LPt: 0.5 | 2EHx: 0.5 |
| Synthetic oil 27B | 1.0 | 0.0 | LPt: 0.75 | TMHx: 0.25 |
| Synthetic oil 28B | 1.0 | 0.0 | LPt: 0.5 | TMHx: 0.5 |
| Synthetic oil 29B | 1.0 | 0.0 | 2MBu: 1.0 | — |
| Synthetic oil 30B | 1.0 | 0.0 | 2MBu: 0.75 | 2EHx: 0.25 |
| Synthetic oil 31B | 1.0 | 0.0 | 2MBu: 0.5 | 2EHx: 0.5 |
| Synthetic oil 32B | 0.70 | 0.30 | 2MBu: 0.85 | 2EHx: 0.15 |
| Synthetic oil 33B | 1.0 | 0.0 | 2MBu: 0.75 | TMHx: 0.25 |
| Synthetic oil 34B | 1.0 | 0.0 | 2MPt: 1.0 | — |
| Synthetic oil 35B | 1.0 | 0.0 | 2MPt: 0.75 | 2EHx: 0.25 |
| Comparative oil 1B | 1.0 | 0.0 | 2EHx: 0.5 | TMHx: 0.5 |
| Comparative oil 2B | 1.0 | 0.0 | LHx: 0.25 | TMHx: 0.75 |
| Comparative oil 3B | 0.0 | 1.0 | LHx: 0.65 | TMHx: 0.35 |
| Comparative oil 4B | 1.0 | 0.0 | LHx: 1.0 | — |
| Comparative oil 5B | 1.0 | 0.0 | 2EBu: 1.0 | — |
| Comparative oil 6B | 0.65 | 0.35 | 2EHx: 1.0 | — |
| Comparative oil 7B | 0.0 | 1.0 | LHx: 0.35 | TMHx: 0.65 |
| Comparative oil 8B | 1.0 | 0.0 | TMHx: 1.0 | — |
| Comparative oil 9B | 0.0 | 1.0 | 2EHx: 0.5 | TMHx: 0.5 |
| Comparative oil 10B | 0.0 | 1.0 | 2MPt: 0.35 | 2EHx: 0.65 |
| Comparative oil 11B | 1.0 | 0.0 | 2EHx: 1.0 | — |
| Comparative oil 12B | 1.0 | 0.0 | LPt: 0.25 | 2EHx: 0.75 |
| Comparative oil 13B | 1.0 | 0.0 | LHx: 0.5 | TMHx: 0.5 |
| Comparative oil 14B | 1.0 | 0.0 | 2MPt: 0.25 | 2EHx: 0.75 |

TABLE B-continued (Polyol ester oils used in Examples and Comparative Examples)

| Oil No. | Alcohol ingredient PE | Alcohol ingredient DiPE | Fatty acid ingredient Acid 1 | Fatty acid ingredient Acid 2 |
|---|---|---|---|---|
| Comparative oil 15B | refrigerant R-290/mineral oil for air conditioner | | | |
| Comparative oil 16B | complex ester obtained from PE, 2EHx, adipic acid, etc. | | | |
| Comparative oil 17B | 0.8 | 0.2 | LPt: 0.4 n-heptanoic acid: 0.4 | TMHx: 0.2 |
| Comparative oil 18B | mixed oil (refrigeration oil B, 25 wt % + comparative oil 1, 75 wt %) Makeup of refrigeration oil B Alcohol: neopentyl glycol Fatty acid: 2EHx | | | |
| Comparative oil 19B | mixed oil (refrigeration oil B, 50 wt % + comparative oil 9, 50 wt %) Makeup of refrigeration oil B Alcohol: neopentyl glycol Fatty acid: 2EHx | | | |
| Comparative oil 20 | mixed oil (refrigeration oil B, 30 wt % + comparative oil 16, 70 wt %) Makeup of refrigeration oil B Alcohol: neopentyl glycol Fatty acid: 2EHx | | | |

Test Example 1B: With Respect to Kinematic Viscosities of Each Polyol Ester Oil Synthesized Each of the polyol ester oils and comparative oils was examined for kinematic viscosity at 40° C. and 100° C. The results of the measurement are shown in Tables 47 and 48.

TABLE 47

| Example No. | Oil No. | Kinematic viscosity mm²/s (40° C.) | Kinematic viscosity mm²/s (100° C.) | Remarks |
|---|---|---|---|---|
| Example 1B | synthetic oil 1B | 69.7 | 8.67 | — |
| Example 2B | synthetic oil 2B | 66.9 | 8.42 | — |
| Example 3B | synthetic oil 3B | 66.0 | 8.39 | — |
| Example 4B | synthetic oil 4B | 64.5 | 8.20 | — |
| Example 5B | synthetic oil 5B | 97.8 | 10.9 | — |
| Example 6B | synthetic oil 6B | 75.1 | 9.10 | — |
| Example 7B | synthetic oil 7B | 60.0 | 7.76 | — |
| Example 8B | synthetic oil 8B | 66.1 | 8.23 | — |
| Example 9B | synthetic oil 9B | 64.4 | 8.20 | — |
| Example 10B | synthetic oil 10B | 62.5 | 7.98 | — |
| Example 11B | synthetic oil 11B | 67.1 | 9.88 | — |
| Example 12B | synthetic oil 12B | 69.0 | 9.26 | — |
| Example 13B | synthetic oil 13B | 61.8 | 8.71 | — |
| Example 14B | synthetic oil 14B | 53.9 | 7.39 | — |
| Example 15B | synthetic oil 15B | 70.0 | 6.99 | — |
| Example 16B | synthetic oil 16B | 140 | 13.8 | — |
| Example 17B | synthetic oil 17B | 139 | 13.6 | — |
| Example 18B | synthetic oil 18B | 141 | 13.6 | — |
| Example 19B | synthetic oil 19B | 124 | 12.4 | — |
| Example 20B | synthetic oil 20B | 108 | 11.4 | — |
| Example 21B | synthetic oil 21B | 149 | 14.0 | — |
| Example 22B | synthetic oil 22B | 196 | 16.7 | — |
| Example 23B | synthetic oil 23B | 164 | 15.0 | — |
| Example 24B | synthetic oil 24B | 225 | 18.3 | — |
| Example 25B | synthetic oil 25B | 276 | 20.9 | — |
| Example 26B | synthetic oil 26B | 27.8 | 4.99 | — |
| Example 27B | synthetic oil 27B | 24.8 | 4.88 | — |
| Example 28B | synthetic oil 28B | 42.7 | 6.69 | — |
| Example 29B | synthetic oil 29B | 25.7 | 4.39 | — |
| Example 30B | synthetic oil 30B | 29.4 | 4.83 | — |
| Example 31B | synthetic oil 31B | 36.8 | 5.47 | — |
| Example 32B | synthetic oil 32B | 47.3 | 6.48 | — |
| Example 33B | synthetic oil 33B | 37.3 | 5.66 | — |
| Example 34B | synthetic oil 34B | 22.4 | 4.31 | — |
| Example 35B | synthetic oil 35B | 26.0 | 4.67 | — |

TABLE 48

| Comparative Example No. | Oil No. | Kinematic viscosity mm²/s (40° C.) | Kinematic viscosity mm²/s (100° C.) | Remarks |
|---|---|---|---|---|
| Comparative Example 1B | comparative oil 1B | 67.8 | 8.34 | — |
| Comparative Example 2B | comparative oil 2B | 64.6 | 8.50 | — |
| Comparative Example 3B | comparative oil 3B | 88.0 | 11.9 | — |
| Comparative Example 4B | comparative oil 4B | 53.0 | 8.72 | solidified at room temperature |
| Comparative Example 5B | comparative oil 5B | 54.0 | 6.36 | solidified at room temperature |
| Comparative Example 6B | comparative oil 6B | 70.4 | 8.74 | — |
| Comparative Example 7B | comparative oil 7B | 181 | 17.6 | — |
| Comparative Example 8B | comparative oil 8B | 114 | 11.5 | solidified at room temperature |
| Comparative Example 9B | comparative oil 9B | 228 | 19.2 | — |
| Comparative Example 10B | comparative oil 10B | 116 | 12.9 | — |
| Comparative Example 11B | comparative oil 11B | 44.3 | 6.26 | — |
| Comparative Example 12B | comparative oil 12B | 34.1 | 5.44 | — |
| Comparative Example 13B | comparative oil 13B | 40.5 | 6.58 | — |
| Comparative Example 14B | comparative oil 14B | 36.4 | 5.60 | — |
| Comparative Example 15B | comparative oil 15B | 95.9 | 8.09 | — |
| Comparative Example 16B | comparative oil 16B | 226 | 21.8 | — |
| Comparative Example 17B | comparative oil 17B | 30.3 | 5.73 | — |
| Comparative Example 18B | comparative oil 18B | 33.8 | 5.44 | — |
| Comparative Example 19B | comparative oil 19B | 32.4 | 5.42 | — |
| Comparative Example 20B | comparative oil 20B | 67.4 | 9.42 | — |

Test 2B: With Respect to Solubility with R-290 and Kinematic Viscosity

Each polyol ester oil and R-290 were enclosed in a glass tube so as to result in an oil content of 20% by weight, and the glass tube was shaken to dissolve the R-290 in the polyol ester oil. After the dissolution, the glass tube was placed in a water bath and gradually heated to measure the temperature at which the even layer separated into an oil layer and a refrigerant layer (high-temperature-side two-layer separation temperature). Meanwhile, the glass tube was placed in a cooling chamber and gradually cooled to measure the temperature at which the even layer separated into an oil layer and a refrigerant layer (low-temperature-side two-layer separation temperature). The results of the measurements and the kinematic viscosities are both shown in Table 49 to Table 51.

TABLE 49

Refrigerant R-290/air conditioner
(as refrigeration oil having kinematic viscosity at 40° C. of 50-100 mm²/s)

| Example Comparative Example No. | Oil No. | Properties High-temperature-side two-layer separation temperature ° C. | Low-temperature-side two-layer separation temperature ° C. | Kinematic viscosity (40° C.) mm²/s |
|---|---|---|---|---|
| Example 36B | synthetic oil 1B | +70 or higher | −50 or lower | 69.7 |
| Example 37B | synthetic oil 2B | +70 or higher | −50 or lower | 66.9 |
| Example 38B | synthetic oil 3B | +70 or higher | −50 or lower | 66.0 |
| Example 39B | synthetic oil 4B | +70 or higher | −50 or lower | 64.5 |
| Example 40B | synthetic oil 5B | +70 or higher | −50 or lower | 97.8 |
| Example 41B | synthetic oil 6B | +70 or higher | −50 or lower | 75.1 |
| Example 42B | synthetic oil 7B | +70 or higher | −50 or lower | 60.0 |
| Example 43B | synthetic oil 8B | +70 or higher | −50 or lower | 66.1 |
| Example 44B | synthetic oil 9B | +70 or higher | −50 or lower | 64.4 |
| Example 45B | synthetic oil 10B | +70 or higher | −50 or lower | 62.5 |
| Example 46B | synthetic oil 11B | +70 or higher | −50 or lower | 67.1 |
| Example 47B | synthetic oil 12B | +70 or higher | −50 or lower | 69.0 |
| Example 48B | synthetic oil 13B | +70 or higher | −50 or lower | 61.8 |
| Example 49B | synthetic oil 14B | +70 or higher | −50 or lower | 53.9 |
| Example 50B | synthetic oil 15B | +70 or higher | −50 or lower | 70.0 |
| Comparative Example 21B | comparative oil 4B | +70 or higher | −50 or lower | 53.0 solidified at room temperature |
| Comparative Example 22B | comparative oil 5B | +70 or higher | −50 or lower | 54.0 solidified at room temperature |

TABLE 50

Refrigerant R-290/large refrigerated facility or air conditioner
(as refrigeration oil having kinematic viscosity at 40° C. of 100-350 mm²/s)

| Example Comparative Example No. | Oil No. | Properties High-temperature-side two-layer separation temperature ° C. | Low-temperature-side two-layer separation temperature ° C. | Kinematic viscosity (40° C.) mm²/s |
|---|---|---|---|---|
| Example 51B | synthetic oil 16B | +70 or higher | −50 or lower | 140 |
| Example 52B | synthetic oil 17B | +70 or higher | −50 or lower | 139 |
| Example 53B | synthetic oil 18B | +70 or higher | −50 or lower | 141 |
| Example 54B | synthetic oil 19B | +70 or higher | −50 or lower | 124 |
| Example 55B | synthetic oil 20B | +70 or higher | −50 or lower | 108 |
| Example 56B | synthetic oil 21B | +70 or higher | −50 or lower | 149 |
| Example 57B | synthetic oil 22B | +70 or higher | −50 or lower | 196 |
| Example 58B | synthetic oil 23B | +70 or higher | −50 or lower | 164 |
| Example 59B | synthetic oil 24B | +70 or higher | −50 or lower | 225 |
| Example 60B | synthetic oil 25B | +70 or higher | −50 or lower | 276 |
| Comparative Example 23B | comparative oil 8B | separated throughout the whole range | separated throughout the whole range | 114 solidified at room temperature |

TABLE 51

Refrigerant R-290/small refrigerated facility
(as refrigeration oil having kinematic viscosity at 40° C. of 15-50 mm²/s)

| Example Comparative Example No. | Oil No. | High-temperature-side two-layer separation temperature ° C. | Low-temperature-side two-layer separation temperature ° C. | Kinematic viscosity (40° C.) mm²/s |
|---|---|---|---|---|
| Example 61B | synthetic oil 26B | +70 or higher | −50 or lower | 27.8 |
| Example 62B | synthetic oil 27B | +70 or higher | −50 or lower | 24.8 |
| Example 63B | synthetic oil 28B | +70 or higher | −50 or lower | 42.7 |
| Example 64B | synthetic oil 29B | +70 or higher | −50 or lower | 25.7 |
| Example 65B | synthetic oil 30B | +70 or higher | −50 or lower | 29.4 |
| Example 66B | synthetic oil 31B | +70 or higher | −50 or lower | 36.8 |
| Example 67B | synthetic oil 32B | +70 or higher | −50 or lower | 47.2 |
| Example 68B | synthetic oil 33B | +70 or higher | −50 or lower | 37.3 |
| Example 69B | synthetic oil 34B | +70 or higher | −50 or lower | 22.4 |
| Example 70B | synthetic oil 35B | +70 or higher | −50 or lower | 26.0 |

Test Example 3B: With Respect to Solubility with R-600a and Kinematic Viscosity

The high-temperature-side two-layer separation temperature and the low-temperature-side two-layer separation temperature were measured in the same manners as in Test Example 1B, except that R-600a was used as a hydrocarbon-based refrigerant. The results of the measurements and the kinematic viscosities are both shown in Table 52 and Table 53.

TABLE 52

Refrigerant R-600a/air conditioner
(as refrigeration oil having kinematic viscosity at 40° C. of 50-100 mm²/s)

| Example Comparative Example No. | Oil No. | High-temperature-side two-layer separation temperature ° C. | Low-temperature-side two-layer separation temperature ° C. | Kinematic viscosity (40° C.) mm²/s |
|---|---|---|---|---|
| Example 71B | synthetic oil 1B | +70 or higher | −50 or lower | 69.7 |
| Example 72B | synthetic oil 2B | +70 or higher | −50 or lower | 66.9 |
| Example 73B | synthetic oil 3B | +70 or higher | −50 or lower | 66.0 |
| Example 74B | synthetic oil 4B | +70 or higher | −50 or lower | 64.5 |
| Example 75B | synthetic oil 5B | +70 or higher | −50 or lower | 97.8 |
| Example 76B | synthetic oil 6B | +70 or higher | −50 or lower | 75.1 |
| Example 77B | synthetic oil 7B | +70 or higher | −50 or lower | 60.0 |
| Example 78B | synthetic oil 8B | +70 or higher | −50 or lower | 66.1 |
| Example 79B | synthetic oil 9B | +70 or higher | −50 or lower | 64.4 |
| Example 80B | synthetic oil 10B | +70 or higher | −50 or lower | 62.5 |
| Example 81B | synthetic oil 11B | +70 or higher | −50 or lower | 67.1 |
| Example 82B | synthetic oil 12B | +70 or higher | −50 or lower | 69.0 |
| Example 83B | synthetic oil 13B | +70 or higher | −50 or lower | 61.8 |
| Example 84B | synthetic oil 14B | +70 or higher | −50 or lower | 53.9 |
| Example 85B | synthetic oil 15B | +70 or higher | −50 or lower | 70.0 |
| Comparative Example 24B | comparative oil 5B | +70 or higher | −50 or lower | 54.0 solidified at room temperature |

TABLE 53

Refrigerant R-600a/large refrigerated facility or air conditioner
(as refrigeration oil having kinematic viscosity at 40° C. of 100-350 mm²/s)

| Example Comparative Example No. | Oil No. | High-temperature-side two-layer separation temperature ° C. | Low-temperature-side two-layer separation temperature ° C. | Kinematic viscosity (40° C.) mm²/s |
|---|---|---|---|---|
| Example 86B | synthetic oil 16B | +70 or higher | −50 or lower | 140 |
| Example 87B | synthetic oil 17B | +70 or higher | −50 or lower | 139 |
| Example 88B | synthetic oil 18B | +70 or higher | −50 or lower | 141 |
| Example 89B | synthetic oil 19B | +70 or higher | −50 or lower | 124 |
| Example 90B | synthetic oil 20B | +70 or higher | −50 or lower | 108 |
| Example 91B | synthetic oil 21B | +70 or higher | −50 or lower | 149 |
| Example 92B | synthetic oil 22B | +70 or higher | −50 or lower | 196 |
| Example 93B | synthetic oil 23B | +70 or higher | −50 or lower | 164 |
| Example 94B | synthetic oil 24B | +70 or higher | −50 or lower | 225 |
| Example 95B | synthetic oil 25B | +70 or higher | −50 or lower | 276 |
| Comparative Example 25B | comparative oil 8B | +70 or higher | −50 or lower | 114 solidified at room temperature |

Test Example 4B: With Respect to Solubility with R-1270 and Kinematic Viscosity

The high-temperature-side two-layer separation temperature and the low-temperature-side two-layer separation temperature were measured in the same manners as in Test Example 1B, except that R-1270 was used as a hydrocarbon-based refrigerant. The results of the measurements and the kinematic viscosities are both shown in Table 54 to Table 56.

TABLE 54

Refrigerant R-1270/air conditioner
(as refrigeration oil having kinematic viscosity at 40° C. of 50-100 mm²/s)

| Example Comparative Example No. | Oil No. | High-temperature-side two-layer separation temperature ° C. | Low-temperature-side two-layer separation temperature ° C. | Kinematic viscosity (40° C.) mm²/s |
|---|---|---|---|---|
| Example 96B | synthetic oil 1B | +70 or higher | −50 or lower | 69.7 |
| Example 97B | synthetic oil 2B | +70 or higher | −50 or lower | 66.9 |
| Example 98B | synthetic oil 3B | +70 or higher | −50 or lower | 66.0 |
| Example 99B | synthetic oil 4B | +70 or higher | −50 or lower | 64.5 |
| Example 100B | synthetic oil 5B | +70 or higher | −50 or lower | 97.8 |
| Example 101B | synthetic oil 6B | +70 or higher | −50 or lower | 75.1 |
| Example 102B | synthetic oil 7B | +70 or higher | −50 or lower | 60.0 |
| Example 103B | synthetic oil 8B | +70 or higher | −50 or lower | 66.1 |
| Example 104B | synthetic oil 9B | +70 or higher | −50 or lower | 64.4 |
| Example 105B | synthetic oil 10B | +70 or higher | −50 or lower | 62.5 |
| Example 106B | synthetic oil 11B | +70 or higher | −50 or lower | 67.1 |
| Example 107B | synthetic oil 12B | +70 or higher | −50 or lower | 69.0 |
| Example 108B | synthetic oil 13B | +70 or higher | −50 or lower | 61.8 |
| Example 109B | synthetic oil 14B | +70 or higher | −50 or lower | 53.9 |
| Example 110B | synthetic oil 15B | +70 or higher | −50 or lower | 70.0 |
| Comparative Example 26B | comparative oil 4B | +70 or higher | −50 or lower | 53.0 solidified at room temperature |
| Comparative Example 27B | comparative oil 5B | +70 or higher | −50 or lower | 54.0 solidified at room temperature |

TABLE 55

Refrigerant R-1270/large refrigerated facility or air conditioner
(as refrigeration oil having kinematic viscosity at 40° C. of 100-350 mm²/s)

| Example Comparative Example No. | Oil No. | High-temperature-side two-layer separation temperature ° C. | Low-temperature-side two-layer separation temperature ° C. | Kinematic viscosity (40° C.) mm²/s |
|---|---|---|---|---|
| Example 111B | synthetic oil 16B | +70 or higher | −50 or lower | 140 |
| Example 112B | synthetic oil 17B | +70 or higher | −50 or lower | 139 |
| Example 113B | synthetic oil 18B | +70 or higher | −50 or lower | 141 |
| Example 114B | synthetic oil 19B | +70 or higher | −50 or lower | 124 |
| Example 115B | synthetic oil 20B | +70 or higher | −50 or lower | 108 |
| Example 116B | synthetic oil 21B | +70 or higher | −50 or lower | 149 |
| Example 117B | synthetic oil 22B | +70 or higher | −50 or lower | 196 |
| Example 118B | synthetic oil 23B | +70 or higher | −50 or lower | 164 |
| Example 119B | synthetic oil 24B | +70 or higher | −50 or lower | 225 |
| Example 120B | synthetic oil 25B | +70 or higher | −50 or lower | 276 |
| Comparative Example 28B | comparative oil 8B | separated throughout the whole range | separated throughout the whole range | 114 solidified at room temperature |

TABLE 56

Refrigerant R-1270/small refrigerated facility
(as refrigeration oil having kinematic viscosity at 40° C. of 15-50 mm²/s)

| Example Comparative Example No. | Oil No. | High-temperature-side two-layer separation temperature ° C. | Low-temperature-side two-layer separation temperature ° C. | Kinematic viscosity (40° C.) mm²/s |
|---|---|---|---|---|
| Example 121B | synthetic oil 26B | +70 or higher | −50 or lower | 27.8 |
| Example 122B | synthetic oil 27B | +70 or higher | −50 or lower | 24.8 |
| Example 123B | synthetic oil 28B | +70 or higher | −50 or lower | 42.7 |
| Example 124B | synthetic oil 29B | +70 or higher | −50 or lower | 25.7 |
| Example 125B | synthetic oil 30B | +70 or higher | −50 or lower | 29.4 |
| Example 126B | synthetic oil 31B | +70 or higher | −50 or lower | 36.8 |
| Example 127B | synthetic oil 32B | +70 or higher | −50 or lower | 47.2 |
| Example 128B | synthetic oil 33B | +70 or higher | −50 or lower | 37.3 |
| Example 129B | synthetic oil 34B | +70 or higher | −50 or lower | 22.4 |
| Example 130B | synthetic oil 35B | +70 or higher | −50 or lower | 26.0 |

Test Example 5B: With Respect to Lubricity of Refrigeration Oils

Examples 1B, 2B, 3B, 4B, and 8B and Comparative Example 1B were evaluated with a Falex tester. The results thereof are shown in Table 57.

(Test Conditions)
Test apparatus: Falex tester (PIN-VEE BLOCK)
Test temperature: 80° C.
Test load: 150 lbs
Test period: 4 hr
Rotation speed: 290 rpm

TABLE 57

| | Example/Comparative Example No. | | | | | |
|---|---|---|---|---|---|---|
| | Example 131B | Example 132B | Example 133B | Example 134B | Example 135B | Comparative Example 29B |
| Oil No. | synthetic oil 1B | synthetic oil 2B | synthetic oil 3B | synthetic oil 4B | synthetic oil 8B | comparative oil 1B |
| 2EHx molar ratio | 1 | 0.5 | 0.32 | 0.15 | 0 | 0.52 |
| DiPE molar ratio | 0.34 | 0.44 | 0.46 | 0.45 | 0.5 | 0 |
| Average molecular weight | 766 | 700 | 670 | 632 | 615 | 668 |

TABLE 57-continued

| | Example 131B | Example 132B | Example 133B | Example 134B | Example 135B | Comparative Example 29B |
|---|---|---|---|---|---|---|
| Wear ratio (Relative value, with Comparative Example 1B taken as 1) | 0.61 | 0.92 | 0.63 | 0.98 | 0.51 | 1 |

Test Example 6B: With Respect to Hygroscopicity

Example 2B and Comparative Example 1B were evaluated through a hygroscopicity test. The results thereof are shown in Table 58.

(Test Conditions)

Test apparatus: A hygroscopicity tester based on a combination of a humidifier, acrylic case, turntable, fan, heater, hygrometer, and thermometer was produced and used.

Test temperature: 30° C.

Test humidity: 80% RH

Surface area of specimen: 21.2 cm$^2$

TABLE 58

| Test period, hr | Example 136B Synthetic oil 2B moisture content, ppm | Comparative Example 30B Comparative oil 1B moisture content, ppm | Example 136B/ Comparative Example 30B Moisture content ratio |
|---|---|---|---|
| 0 | 24 | 22 | 1.09 |
| 1 | 148 | 174 | 0.85 |
| 2 | 261 | 350 | 0.74 |
| 3 | 334 | 500 | 0.67 |
| 4 | 431 | 640 | 0.67 |
| 6 | 605 | 790 | 0.77 |
| 8 | 780 | 921 | 0.85 |
| 10 | 932 | 1030 | 0.90 |
| 15 | 1200 | 1180 | 1.02 |
| 26 | 1587 | 1336 | 1.19 |

TABLE 58-continued

| Test period, hr | Example 136B Synthetic oil 2B moisture content, ppm | Comparative Example 30B Comparative oil 1B moisture content, ppm | Example 136B/ Comparative Example 30B Moisture content ratio |
|---|---|---|---|
| 48 | 2150 | 1459 | 1.47 |
| 72 | 2296 | 1580 | 1.52 |
| 96 | 2523 | 1622 | 1.55 |

Figure 2:
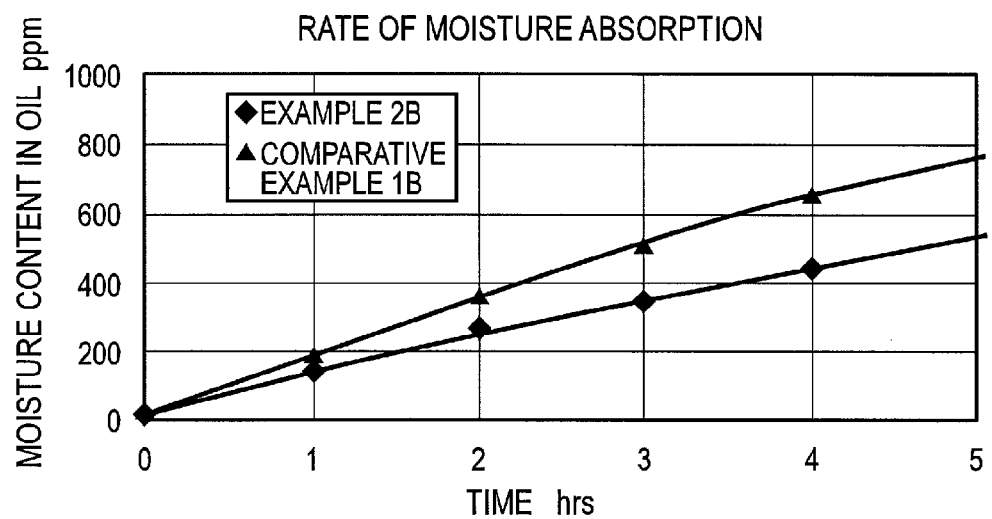
FIG. 2 is graphs which show the results of examinations for a relationship between open time and moisture content in oil, with respect to Example 2B and Comparative Example 1B.

The open time which was supposed when facility dealers handled refrigeration oils was set at 0.5 to 3 hours among the test periods shown in Table 58, and refrigeration oils were compared in the degree of moisture absorption in a range including shorter and longer periods. The results thereof are shown in FIG. 2.

Test Example 7B: With Respect to Hydrolytic Resistance

A polyol ester oil which had a moisture content of 500 ppm and to which an antioxidant and an acid scavenger had been added as additives was enclosed in a glass tube together with refrigerant R-290 and an iron wire, copper wire, or aluminum wire as a catalyst, and a heating test was conducted for 14 days in a 175° C. thermostatic chamber. After completion of the heating period, the contents were examined for appearance, color, any change in the catalyst, and precipitate. Furthermore, the polyol ester oil which had undergone the test was taken out and examined for acid value. The results thereof are shown in Table 59 and Table 60.

TABLE 59

| | Example 137B | Example 138B | Example 139B | Example 140B | Example 141B | Example 142B |
|---|---|---|---|---|---|---|
| Oil No. | synthetic oil 1B | synthetic oil 2B | synthetic oil 3B | synthetic oil 4B | synthetic oil 5B | synthetic oil 6B |
| Appearance | transparent | transparent | transparent | transparent | transparent | transparent |
| Color (ASTM) | L 0.5 | L 0.5 | L 0.5 | L 0.5 | L 0.5 | L 0.5 |
| Change of catalyst, iron | light brown | light brown | light brown | light brown | light brown | light brown |
| Change of catalyst, copper | no change | no change | no change | no change | no change | no change |
| Change of catalyst, aluminum | no change | no change | no change | no change | no change | no change |
| Precipitate | none | none | none | none | none | none |
| Acid value, mg-KOH/g | 0.04 | 0.04 | 0.04 | 0.05 | 0.04 | 0.04 |

TABLE 60

| | Example 143B | Example 144B | Example 145B | Example 146B | Comparative Example 31B | Comparative Example 32B |
|---|---|---|---|---|---|---|
| Oil No. | synthetic oil 7B | synthetic oil 8B | synthetic oil 9B | synthetic oil 10B | comparative oil 1B | comparative oil 15B |
| Appearance | transparent | transparent | transparent | transparent | transparent | transparent |
| Color (ASTM) | L 0.5 | L 0.5 | L 0.5 | L 0.5 | L 0.5 | L 0.5 |
| Change of catalyst, iron | light brown | light brown | light brown | light brown | light brown | light brown |
| Change of catalyst, copper | no change | no change | no change | no change | no change | no change |
| Change of catalyst, aluminum | no change | no change | no change | no change | no change | no change |
| Precipitate | none | none | none | none | none | none |
| Acid value, mg-KOH/g | 0.04 | 0.04 | 0.04 | 0.05 | 0.04 | 0.01 |

Test Example 8B: With Respect to Other Properties

Density, color, flash point, pour point, kinematic viscosity, viscosity index, and total acid number, as properties required of refrigeration oils, are shown in Table 61 to Table 65 on the basis of Examples and Comparative Examples.

TABLE 61

(as refrigeration oil having kinematic viscosity at 40° C. of 50-100 mm$^2$/s)

| | Example 147B | Example 148B | Example 149B | Example 150B | Example 151B |
|---|---|---|---|---|---|
| Oil No. | synthetic oil 1B | synthetic oil 2B | synthetic oil 3B | synthetic oil 4B | synthetic oil 5B |
| Density, 15° C. g/cm$^3$ | 0.99 | 1.00 | 1.01 | 1.02 | 1.00 |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 250 or higher |
| Pour point, ° C. | −35 | −37.5 | −40 | −42.5 | −35 |
| Kinematic viscosity, 40° C. mm$^2$/s | 69.7 | 66.9 | 66.0 | 62.5 | 97.8 |
| Kinematic viscosity, 100° C. mm$^2$/s | 8.67 | 8.42 | 8.39 | 8.02 | 10.9 |
| Viscosity index | 95 | 94 | 95 | 93 | 96 |
| Moisture content, ppm | 25 | 25 | 25 | 25 | 25 |
| Total acid number, mg-KOH/g | 0.01 | 0.01 | 0.01 | 0.01 | 0.01 |

TABLE 62

(as refrigeration oil having kinematic viscosity at 40° C. of 50-100 mm$^2$/s)

| | Example 152B | Example 153B | Example 154B | Example 155B | Example 156B |
|---|---|---|---|---|---|
| Oil No. | synthetic oil 6B | synthetic oil 7B | synthetic oil 8B | synthetic oil 9B | synthetic oil 10B |
| Density, 15° C. g/cm$^3$ | 1.02 | 0.98 | 1.03 | 0.97 | 1.00 |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 250 or higher |
| Pour point, ° C. | −35 | −40 | −37.5 | −40 | −35 |
| Kinematic viscosity, 40° C. mm$^2$/s | 75.1 | 60.0 | 66.1 | 64.4 | 62.5 |
| Kinematic viscosity, 100° C. mm$^2$/s | 9.10 | 7.75 | 8.23 | 8.20 | 8.34 |
| Viscosity index | 94 | 91 | 91 | 91 | 94 |
| Moisture content, ppm | 25 | 25 | 25 | 25 | 25 |

TABLE 62-continued (as refrigeration oil having kinematic viscosity at 40° C. of 50-100 mm²/s)

| | Example/Comparative Example No. | | | | |
|---|---|---|---|---|---|
| | Example 152B | Example 153B | Example 154B | Example 155B | Example 156B |
| Total acid number, mg-KOH/g | 0.01 | 0.01 | 0.01 | 0.01 | 0.01 |

TABLE 63

(as refrigeration oil having kinematic viscosity at 40° C. of 50-100 mm²/s)

| | Example/Comparative Example No. | | | | |
|---|---|---|---|---|---|
| | Example 157B | Example 158B | Example 159B | Example 160B | Comparative Example 33B |
| Oil No. | synthetic oil 11B | synthetic oil 12B | synthetic oil 13B | synthetic oil 15B | comparative oil 1B |
| Density, 15° C. g/cm³ | 1.03 | 1.01 | 0.98 | 1.03 | 0.959 |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 250 or higher |
| Pour point, ° C. | −47.5 | −42.5 | −42.5 | −35 | −40 |
| Kinematic viscosity, 40° C. mm²/s | 67.1 | 69.0 | 61.8 | 70.0 | 67.8 |
| Kinematic viscosity, 100° C. mm²/s | 9.88 | 9.26 | 8.71 | 6.99 | 8.34 |
| Viscosity index | 130 | 111 | 115 | 61 | 90 |
| Moisture content, ppm | 25 | 25 | 25 | 25 | 25 |
| Total acid number, mg-KOH/g | 0.01 | 0.01 | 0.01 | 0.01 | 0.01 |

TABLE 64

(as refrigeration oil having kinematic viscosity at 40° C. of 100-320 mm²/s)

| | Example/Comparative Example No. | | | | |
|---|---|---|---|---|---|
| | Example 161B | Example 162B | Example 163B | Example 164B | Comparative Example 34B |
| Oil No. | synthetic oil 16B | synthetic oil 17B | synthetic oil 24B | synthetic oil 25B | comparative oil 16B |
| Density, 15° C. g/cm³ | 1.01 | 1.02 | 1.00 | 0.99 | 1.02 |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 224 |
| Pour point, ° C. | −35 | −37.5 | −35 | −35 | −32.5 |
| Kinematic viscosity, 40° C. mm²/s | 140 | 139 | 225 | 276 | 226 |
| Kinematic viscosity, 100° C. mm²/s | 13.8 | 13.6 | 18.3 | 20.9 | 21.8 |
| Viscosity index | 94 | 93 | 89 | 89 | 116 |
| Moisture content, ppm | 25 | 25 | 25 | 25 | 25 |
| Total acid number, mg-KOH/g | 0.01 | 0.01 | 0.01 | 0.01 | 0.01 |

TABLE 65

(as refrigeration oil having kinematic viscosity at 40° C. of 15-50 mm²/s)

| | Example/Comparative Example No. | | | | |
|---|---|---|---|---|---|
| | Example 165B | Example 166B | Example 167B | Example 168B | Comparative Example 35B |
| Oil No. | synthetic oil 30B | synthetic oil 31B | synthetic oil 32B | synthetic oil 35B | comparative oil 17B |
| Density, 15° C. g/cm³ | 1.00 | 0.99 | 1.02 | 0.99 | 0.99 |

TABLE 65-continued (as refrigeration oil having kinematic viscosity at 40° C. of 15-50 mm²/s)

| | Example/Comparative Example No. | | | | |
|---|---|---|---|---|---|
| | Example 165B | Example 166B | Example 167B | Example 168B | Comparative Example 35B |
| Color (ASTM) | L 0.5 | L 0.5 | L 0.5 | L 0.5 | L 0.5 |
| Flash point, COC, ° C. | 250 or higher | 250 or higher | 250 or higher | 250 or higher | 250 or higher |
| Pour point, ° C. | −42.5 | −40 | −42.5 | −45 | −50 |
| Kinematic viscosity, 40° C. mm²/s | 29.4 | 36.8 | 47.3 | 26.0 | 30.3 |
| Kinematic viscosity, 100° C. mm²/s | 4.83 | 5.47 | 6.48 | 4.67 | 5.73 |
| Viscosity index | 76 | 76 | 82 | 93 | 133 |
| Moisture content, ppm | 25 | 25 | 25 | 25 | 50 |
| Total acid number, mg-KOH/g | 0.01 | 0.01 | 0.01 | 0.01 | 0.02 |

(List of Polyol Ester Oils for Each Raw Material Combination)

The Examples and the Comparative Examples are arranged with respect to each of raw material combinations to show that various viscosities and solubility with various refrigerants are obtained by changing the ratio of raw materials. The relationships between the raw material combination and kinematic viscosity or refrigerated facilities/air conditioners to which the oil is applicable are as shown in the following Table 66 to Table 75.

TABLE 66

Raw material combination (1): alcohols, PE and DiPE; acid 1, 2MBu; acid 2, 2EHx

| Oil No. | PE | DiPE | 2MBu | 2EHx | Kinematic viscosity (40° C.) mm²/s | Refrigerating apparatus |
|---|---|---|---|---|---|---|
| Synthetic oil 1B | 0.60 | 0.40 | 0.4 | 0.6 | 69.7 | air conditioner |
| Synthetic oil 2B | 0.55 | 0.45 | 0.5 | 0.5 | 66.9 | air conditioner |
| Synthetic oil 3B | 0.55 | 0.45 | 0.7 | 0.3 | 66.0 | air conditioner |
| Synthetic oil 4B | 0.55 | 0.45 | 0.85 | 0.15 | 64.5 | air conditioner |
| Synthetic oil 5B | 0.30 | 0.70 | 0.5 | 0.5 | 97.8 | air conditioner |
| Synthetic oil 6B | 0.55 | 0.45 | 0.45 | 0.55 | 75.1 | air conditioner |
| Synthetic oil 16B | 0.0 | 1.0 | 0.5 | 0.5 | 140 | large refrigerated facility or air conditioner |
| Synthetic oil 17B | 0.0 | 1.0 | 0.7 | 0.3 | 139 | large refrigerated facility or air conditioner |
| Synthetic oil 18B | 0.0 | 1.0 | 1.0 | 0.0 | 141 | large refrigerated facility or air conditioner |
| Synthetic oil 19B | 0.10 | 0.90 | 1.0 | 0.0 | 124 | large refrigerated facility or air conditioner |
| Synthetic oil 29B | 1.0 | 0.0 | 1.0 | 0.0 | 25.7 | small refrigerated facility |
| Synthetic oil 30B | 1.0 | 0.0 | 0.75 | 0.25 | 29.4 | small refrigerated facility |
| Synthetic oil 31B | 1.0 | 0.0 | 0.5 | 0.5 | 36.8 | small refrigerated facility |
| Synthetic oil 32B | 0.70 | 0.30 | 0.85 | 0.15 | 47.2 | small refrigerated facility |
| Comparative oil 6B | 0.65 | 0.35 | 0.0 | 1.0 | 70.4 | — |
| Comparative oil 11B | 1.0 | 0.0 | 0.0 | 1.0 | 44.3 | — |

TABLE 67

Raw material combination (2): alcohols, PE and DiPE; acid 1, 2MBu; acid 2, TMHx

| Oil No. | PE | DiPE | 2MBu | TMHx | Kinematic viscosity (40° C.) mm$^2$/s | Refrigerating apparatus |
|---|---|---|---|---|---|---|
| Synthetic oil 7B | 1.0 | 0.0 | 0.5 | 0.5 | 60.0 | air conditioner |
| Synthetic oil 8B | 0.50 | 0.50 | 1.0 | 0.0 | 66.1 | air conditioner |
| Synthetic oil 9B | 1.0 | 0.0 | 0.4 | 0.6 | 64.4 | air conditioner |
| Synthetic oil 10B | 0.85 | 0.15 | 0.6 | 0.4 | 62.5 | air conditioner |
| Synthetic oil 18B | 0.0 | 1.0 | 1.0 | 0.0 | 141 | large refrigerated facility or air conditioner |
| Synthetic oil 19B | 0.10 | 0.90 | 1.0 | 0.0 | 124 | large refrigerated facility or air conditioner |
| Synthetic oil 20B | 0.70 | 0.30 | 0.5 | 0.5 | 108 | large refrigerated facility or air conditioner |
| Synthetic oil 21B | 0.50 | 0.50 | 0.5 | 0.5 | 149 | large refrigerated facility or air conditioner |
| Synthetic oil 22B | 0.30 | 0.70 | 0.5 | 0.5 | 196 | large refrigerated facility or air conditioner |
| Synthetic oil 23B | 0.0 | 1.0 | 0.9 | 0.1 | 164 | large refrigerated facility or air conditioner |
| Synthetic oil 24B | 0.0 | 1.0 | 0.7 | 0.3 | 225 | large refrigerated facility or air conditioner |
| Synthetic oil 25B | 0.0 | 1.0 | 0.5 | 0.5 | 276 | large refrigerated facility or air conditioner |
| Synthetic oil 29B | 1.0 | 0.0 | 1.0 | 0.0 | 25.7 | small refrigerated facility |
| Synthetic oil 33B | 1.0 | 0.0 | 0.75 | 0.25 | 37.3 | small refrigerated facility |
| Comparative oil 8B | 1.0 | 0.0 | 0.0 | 1.0 | 114 solidified at room temperature | — |

TABLE 68

Raw material combination (3): alcohols, PE and DiPE; acid 1, LPt; acid 2, 2EHx

| Oil No. | PE | DiPE | LPt | 2EHx | Kinematic viscosity (40° C.) mm$^2$/s | Refrigerating apparatus |
|---|---|---|---|---|---|---|
| Synthetic oil 26B | 1.0 | 0.0 | 0.5 | 0.5 | 27.8 | small refrigerated facility |
| Comparative oil 6B | 0.65 | 0.35 | 0.0 | 1.0 | 70.4 | — |
| Comparative oil 11B | 1.0 | 0.0 | 0.0 | 1.0 | 44.3 | — |
| Comparative oil 12B | 1.0 | 0.0 | 0.25 | 0.75 | 34.1 | — |

TABLE 69

Raw material combination (4): alcohols, PE and DiPE; acid 1, LPt; acid 2, TMHx

| Oil No. | PE | DiPE | LPt | TMHx | Kinematic viscosity (40° C.) mm$^2$/s | Refrigerating apparatus |
|---|---|---|---|---|---|---|
| Synthetic oil 11B | 0.0 | 1.0 | 0.8 | 0.2 | 67.1 | air conditioner |
| Synthetic oil 27B | 1.0 | 0.0 | 0.75 | 0.25 | 24.8 | small refrigerated facility |
| Synthetic oil 28B | 1.0 | 0.0 | 0.5 | 0.5 | 42.7 | small refrigerated facility |
| Comparative oil 8B | 1.0 | 0.0 | 0.0 | 1.0 | 114 solidified at room temperature | — |

TABLE 70

Raw material combination (5): alcohols, PE and DiPE; acid 1, 2MPt; acid 2, 2EHx

| Oil No. | PE | DiPE | 2MPt | 2EHx | Kinematic viscosity (40° C.) mm$^2$/s | Refrigerating apparatus |
|---|---|---|---|---|---|---|
| Synthetic oil 12B | 0.25 | 0.75 | 0.8 | 0.2 | 69.0 | air conditioner |
| Synthetic oil 13B | 0.25 | 0.75 | 1.0 | 0.0 | 61.8 | air conditioner |
| Synthetic oil 34B | 1.0 | 0.0 | 1.0 | 0.0 | 22.4 | small refrigerated facility |
| Synthetic oil 35B | 1.0 | 0.0 | 0.75 | 0.25 | 26.0 | small refrigerated facility |
| Comparative oil 6B | 0.65 | 0.35 | 0.0 | 1.0 | 70.4 | — |
| Comparative oil 10B | 0.0 | 1.0 | 0.3 | 0.7 | 116 | — |

TABLE 70-continued

Raw material combination (5): alcohols, PE and DiPE; acid 1, 2MPt; acid 2, 2EHx

| Oil No. | PE | DiPE | 2MPt | 2EHx | Kinematic viscosity (40° C.) mm²/s | Refrigerating apparatus |
|---|---|---|---|---|---|---|
| Comparative oil 11B | 1.0 | 0.0 | 0.0 | 1.0 | 44.3 | — |
| Comparative oil 14B | 1.0 | 0.0 | 0.25 | 0.75 | 36.4 | — |

TABLE 71

Raw material combination (6): alcohols, PE and DiPE; acid 1, 2MPt; acid 2, TMHx

| Oil No. | PE | DiPE | 2MPt | TMHx | Kinematic viscosity (40° C.) mm²/s | Refrigerating apparatus |
|---|---|---|---|---|---|---|
| Synthetic oil 13B | 0.25 | 0.75 | 1.0 | 0.0 | 61.8 | air conditioner |
| Synthetic oil 14B | 1.0 | 0.0 | 0.5 | 0.5 | 53.9 | air conditioner |
| Synthetic oil 34B | 1.0 | 0.0 | 1.0 | 0.0 | 22.4 | small refrigerated facility |
| Comparative oil 8B | 1.0 | 0.0 | 0.0 | 1.0 | 114 solidified at room temperature | — |

TABLE 72

Raw material combination (7): alcohols, PE and DiPE; acid 1, 2EBu; acid 2, TMHx

| Oil No. | PE | DiPE | 2EBu | TMHx | Kinematic viscosity (40° C.) mm²/s | Refrigerating apparatus |
|---|---|---|---|---|---|---|
| Synthetic oil 15B | 1.0 | 0.0 | 0.75 | 0.25 | 70.0 | air conditioner |
| Comparative oil 8B | 1.0 | 0.0 | 0.0 | 1.0 | 114 solidified at room temperature | — |

TABLE 73

Raw material combination (8): alcohols, PE and DiPE; acid 1, LHx; acid 2, TMHx

| Oil No. | PE | DiPE | LHx | TMHx | Kinematic viscosity (40° C.) mm²/s | Refrigerating apparatus |
|---|---|---|---|---|---|---|
| Comparative oil 2B | 1.0 | 0.0 | 0.25 | 0.75 | 64.6 | — |
| Comparative oil 3B | 0.0 | 1.0 | 0.67 | 0.33 | 88.0 | — |
| Comparative oil 4B | 0.0 | 1.0 | 1.0 | 0.0 | 53.0 solidified at room temperature | — |
| Comparative oil 7B | 0.0 | 1.0 | 0.3 | 0.7 | 181 | — |
| Comparative oil 8B | 1.0 | 0.0 | 0.0 | 1.0 | 114 solidified at room temperature | — |
| Comparative oil 13B | 1.0 | 0.0 | 0.5 | 0.5 | 40.5 | — |

TABLE 74

Raw material combination (9): alcohols, PE and DiPE; acid 1, 2EHx; acid 2, TMHx

| Oil No. | PE | DiPE | 2EHx | TMHx | Kinematic viscosity (40° C.) mm²/s | Refrigerating apparatus |
|---|---|---|---|---|---|---|
| Comparative oil 1B | 1.0 | 0.0 | 0.5 | 0.5 | 67.8 | air conditioner |
| Comparative oil 6B | 0.65 | 0.35 | 1.0 | 0.0 | 70.4 | — |
| Comparative oil 8B | 1.0 | 0.0 | 0.0 | 1.0 | 114 solidified at room temperature | — |
| Comparative oil 9B | 0.0 | 1.0 | 0.5 | 0.5 | 228 | — |
| Comparative oil 11B | 1.0 | 0.0 | 1.0 | 0.0 | 44.3 | — |

TABLE 75

Other combinations

| Oil No. | PE | DiPE | Acids | Kinematic viscosity (40° C.) mm²/s | Refrigerating apparatus |
|---|---|---|---|---|---|
| Comparative oil 17B | 0.8 | 0.2 | LPt: 0.4 n-heptanoic acid: 0.4 MHx: 0.2 | 30.3 | small refrigerated facility |
| Comparative oil 15B | refrigerant R-290/mineral oil for air conditioner | | | 95.9 | air conditioner |
| Comparative oil 16B | complex ester obtained from PE, 2EHx, adipic acid, etc. | | | 226 | large refrigerated facility or air conditioner |
| Refrigerating machine oil B | Alcohol: neopentyl glycol Fatty acid: 2EHx | | | 7.56 | domestic refrigerator |

The relationship between each raw material combination and the solubility with each refrigerant (low-temperature-side two-layer separation temperature) is as shown in the following Table 76 to Table 85.

TABLE 76

Alcohols, PE and DiPE; acid 1, 2MBu; acid 2, 2EHx

| Oil No. | PE | DiPE | 2MBu | 2EHx | Low-temperature-side two-layer separation temperature (oil content, 20%), ° C. | | |
|---|---|---|---|---|---|---|---|
| | | | | | R-290 | R-600a | R-1270 |
| Synthetic oil 1B | 0.60 | 0.40 | 0.4 | 0.6 | −50 or lower | −50 or lower | −50 or lower |
| Synthetic oil 2B | 0.55 | 0.45 | 0.5 | 0.5 | −50 or lower | −50 or lower | −50 or lower |
| Synthetic oil 3B | 0.55 | 0.45 | 0.7 | 0.3 | −50 or lower | −50 or lower | −50 or lower |
| Synthetic oil 4B | 0.55 | 0.45 | 0.85 | 0.15 | −50 or lower | −50 or lower | −50 or lower |
| Synthetic oil 5B | 0.30 | 0.70 | 0.5 | 0.5 | −50 or lower | −50 or lower | −50 or lower |
| Synthetic oil 6B | 0.55 | 0.45 | 0.45 | 0.55 | −50 or lower | −50 or lower | −50 or lower |
| Synthetic oil 16B | 0.0 | 1.0 | 0.5 | 0.5 | −50 or lower | −50 or lower | −50 or lower |
| Synthetic oil 17B | 0.0 | 1.0 | 0.7 | 0.3 | −50 or lower | −50 or lower | −50 or lower |
| Synthetic oil 18B | 0.0 | 1.0 | 1.0 | 0.0 | −50 or lower | −50 or lower | −50 or lower |
| Synthetic oil 19B | 0.10 | 0.90 | 1.0 | 0.0 | −50 or lower | −50 or lower | −50 or lower |
| Synthetic oil 29B | 1.0 | 0.0 | 1.0 | 0.0 | −50 or lower | −50 or lower | −50 or lower |
| Synthetic oil 30B | 1.0 | 0.0 | 0.75 | 0.25 | −50 or lower | −50 or lower | −50 or lower |
| Synthetic oil 31B | 1.0 | 0.0 | 0.5 | 0.5 | −50 or lower | −50 or lower | −50 or lower |
| Synthetic oil 32B | 0.70 | 0.30 | 0.85 | 0.15 | −50 or lower | −50 or lower | −50 or lower |
| Comparative oil 6B | 0.65 | 0.35 | 0.0 | 1.0 | −50 or lower | −50 or lower | −50 or lower |
| Comparative oil 11B | 1.0 | 0.0 | 0.0 | 1.0 | −50 or lower | −50 or lower | −50 or lower |

TABLE 77

Alcohols, PE and DiPE; acid 1, 2MBu; acid 2, TMHx

| Oil No. | PE | DiPE | 2MBu | TMHx | Low-temperature-side two-layer separation temperature (oil content, 20%), ° C. | | |
|---|---|---|---|---|---|---|---|
| | | | | | R-290 | R-600a | R-1270 |
| Synthetic oil 7B | 1.0 | 0.0 | 0.5 | 0.5 | −50 or lower | −50 or lower | −50 or lower |
| Synthetic oil 8B | 0.50 | 0.50 | 1.0 | 0.0 | −50 or lower | −50 or lower | −50 or lower |
| Synthetic oil 9B | 1.0 | 0.0 | 0.4 | 0.6 | −50 or lower | −50 or lower | −50 or lower |
| Synthetic oil 10B | 0.85 | 0.15 | 0.6 | 0.4 | −50 or lower | −50 or lower | −50 or lower |
| Synthetic oil 18B | 0.0 | 1.0 | 1.0 | 0.0 | −50 or lower | −50 or lower | −50 or lower |
| Synthetic oil 19B | 0.10 | 0.90 | 1.0 | 0.0 | −50 or lower | −50 or lower | −50 or lower |
| Synthetic oil 20B | 0.70 | 0.30 | 0.5 | 0.5 | −50 or lower | −50 or lower | −50 or lower |
| Synthetic oil 21B | 0.50 | 0.50 | 0.5 | 0.5 | −50 or lower | −50 or lower | −50 or lower |
| Synthetic oil 22B | 0.30 | 0.70 | 0.5 | 0.5 | −50 or lower | −50 or lower | −50 or lower |
| Synthetic oil 23B | 0.0 | 1.0 | 0.9 | 0.1 | −50 or lower | −50 or lower | −50 or lower |
| Synthetic oil 24B | 0.0 | 1.0 | 0.7 | 0.3 | −50 or lower | −50 or lower | −50 or lower |
| Synthetic oil 25B | 0.0 | 1.0 | 0.5 | 0.5 | −50 or lower | −50 or lower | −50 or lower |
| Synthetic oil 29B | 1.0 | 0.0 | 1.0 | 0.0 | −50 or lower | −50 or lower | −50 or lower |

TABLE 77-continued

Alcohols, PE and DiPE; acid 1, 2MBu; acid 2, TMHx

| | | | | | Low-temperature-side two-layer separation temperature (oil content, 20%), °C. | | |
|---|---|---|---|---|---|---|---|
| Oil No. | PE | DiPE | 2MBu | TMHx | R-290 | R-600a | R-1270 |
| Synthetic oil 33B | 1.0 | 0.0 | 0.75 | 0.25 | −50 or lower | −50 or lower | −50 or lower |
| Comparative oil 8B | 1.0 | 0.0 | 0.0 | 1.0 | −50 or lower | −50 or lower | −50 or lower |

TABLE 78

Alcohols, PE and DiPE; acid 1, LPt; acid 2, 2EHx

| | | | | | Low-temperature-side two-layer separation temperature (oil content, 20%), °C. | | |
|---|---|---|---|---|---|---|---|
| Oil No. | PE | DiPE | LPt | 2EHx | R-290 | R-600a | R-1270 |
| Synthetic oil 26B | 1.0 | 0.0 | 0.5 | 0.5 | −50 or lower | −50 or lower | −50 or lower |
| Comparative oil 6B | 0.65 | 0.35 | 0.0 | 1.0 | −50 or lower | −50 or lower | −50 or lower |
| Comparative oil 11B | 1.0 | 0.0 | 0.0 | 1.0 | −50 or lower | −50 or lower | −50 or lower |
| Comparative oil 12B | 1.0 | 0.0 | 0.25 | 0.75 | −50 or lower | −50 or lower | −50 or lower |

TABLE 79

Alcohols, PE and DiPE; acid 1, LPt; acid 2, TMHx

| | | | | | Low-temperature-side two-layer separation temperature (oil content, 20%), °C. | | |
|---|---|---|---|---|---|---|---|
| Oil No. | PE | DiPE | LPt | TMHx | R-290 | R-600a | R-1270 |
| Synthetic oil 11B | 0.0 | 1.0 | 0.8 | 0.2 | −50 or lower | −50 or lower | −50 or lower |
| Synthetic oil 27B | 1.0 | 0.0 | 0.75 | 0.25 | −50 or lower | −50 or lower | −50 or lower |
| Synthetic oil 28B | 1.0 | 0.0 | 0.5 | 0.5 | −50 or lower | −50 or lower | −50 or lower |
| Comparative oil 8B | 1.0 | 0.0 | 0.0 | 1.0 | −50 or lower | −50 or lower | −50 or lower |

TABLE 80

Alcohols, PE and DiPE; acid 1, 2MPt; acid 2, 2EHx

| | | | | | Low-temperature-side two-layer separation temperature (oil content, 20%), °C. | | |
|---|---|---|---|---|---|---|---|
| Oil No. | PE | DiPE | 2MPt | 2EHx | R-290 | R-600a | R-1270 |
| Synthetic oil 12B | 0.25 | 0.75 | 0.8 | 0.2 | −50 or lower | −50 or lower | −50 or lower |
| Synthetic oil 13B | 0.25 | 0.75 | 1.0 | 0.0 | −50 or lower | −50 or lower | −50 or lower |
| Synthetic oil 34B | 1.0 | 0.0 | 1.0 | 0.0 | −50 or lower | −50 or lower | −50 or lower |
| Synthetic oil 35B | 1.0 | 0.0 | 0.75 | 0.25 | −50 or lower | −50 or lower | −50 or lower |
| Comparative oil 6B | 0.65 | 0.35 | 0.0 | 1.0 | −50 or lower | −50 or lower | −50 or lower |
| Comparative oil 10B | 0.0 | 1.0 | 0.3 | 0.7 | −50 or lower | −50 or lower | −50 or lower |

TABLE 80-continued

Alcohols, PE and DiPE; acid 1, 2MPt; acid 2, 2EHx

| Oil No. | PE | DiPE | 2MPt | 2EHx | Low-temperature-side two-layer separation temperature (oil content, 20%), ° C. | | |
|---|---|---|---|---|---|---|---|
| | | | | | R-290 | R-600a | R-1270 |
| Comparative oil 11B | 1.0 | 0.0 | 0.0 | 1.0 | −50 or lower | −50 or lower | −50 or lower |
| Comparative oil 14B | 1.0 | 0.0 | 0.25 | 0.75 | +32 | −19 | −50 or lower |

TABLE 81

Alcohols, PE and DiPE; acid 1, 2MPt; acid 2, TMHx

| Oil No. | PE | DiPE | 2MPt | 2EHx | Low-temperature-side two-layer separation temperature (oil content, 20%), ° C. | | |
|---|---|---|---|---|---|---|---|
| | | | | | R-290 | R-600a | R-1270 |
| Synthetic oil 13B | 0.25 | 0.75 | 1.0 | 0.0 | −50 or lower | −50 or lower | −50 or lower |
| Synthetic oil 14B | 1.0 | 0.0 | 0.5 | 0.5 | −50 or lower | −50 or lower | −50 or lower |
| Synthetic oil 34B | 1.0 | 0.0 | 1.0 | 0.0 | −50 or lower | −50 or lower | −50 or lower |
| Comparative oil 8B | 1.0 | 0.0 | 0.0 | 1.0 | −50 or lower | −50 or lower | −50 or lower |

TABLE 82

Alcohols, PE and DiPE; acid 1, 2EBu; acid 2, TMHx

| Oil No. | PE | DiPE | 2EBu | TMHx | Low-temperature-side two-layer separation temperature (oil content, 20%), ° C. | | |
|---|---|---|---|---|---|---|---|
| | | | | | R-290 | R-600a | R-1270 |
| Synthetic oil 15B | 1.0 | 0.0 | 0.75 | 0.25 | −50 or lower | −50 or lower | −50 or lower |
| Comparative oil 8B | 1.0 | 0.0 | 0.0 | 1.0 | −50 or lower | −50 or lower | −50 or lower |

TABLE 83

Alcohols, PE and DiPE; acid 1, LHx; acid 2, TMHx

| Oil No. | PE | DiPE | LHx | TMHx | Low-temperature-side two-layer separation temperature (oil content, 20%), ° C. | | |
|---|---|---|---|---|---|---|---|
| | | | | | R-290 | R-600a | R-1270 |
| Comparative oil 2B | 1.0 | 0.0 | 0.25 | 0.75 | −50 or lower | −50 or lower | −50 or lower |
| Comparative oil 3B | 0.0 | 1.0 | 0.67 | 0.33 | −50 or lower | −50 or lower | −50 or lower |
| Comparative oil 7B | 0.0 | 1.0 | 0.3 | 0.7 | −50 or lower | −50 or lower | −50 or lower |
| Comparative oil 8A | 1.0 | 0.0 | 0.0 | 1.0 | −50 or lower | −50 or lower | −50 or lower |
| Comparative oil 13B | 1.0 | 0.0 | 0.5 | 0.5 | −50 or lower | −50 or lower | −50 or lower |

TABLE 84

Alcohols, PE and DiPE; acid 1, 2EHx; acid 2, TMHx

| Oil No. | PE | DiPE | 2EHx | TMHx | Low-temperature-side two-layer separation temperature (oil content, 20%), ° C. | | |
|---|---|---|---|---|---|---|---|
| | | | | | R-290 | R-600a | R-1270 |
| Comparative oil 1B | 1.0 | 0.0 | 0.5 | 0.5 | −50 or lower | −50 or lower | −50 or lower |
| Comparative oil 6B | 0.65 | 0.35 | 1.0 | 0.0 | −50 or lower | −50 or lower | −50 or lower |
| Comparative oil 8B | 1.0 | 0.0 | 0.0 | 1.0 | −50 or lower | −50 or lower | −50 or lower |
| Comparative oil 9B | 0.0 | 1.0 | 0.5 | 0.5 | −50 or lower | −50 or lower | −50 or lower |
| Comparative oil 11B | 1.0 | 0.0 | 1.0 | 0.0 | −50 or lower | −50 or lower | −50 or less |

TABLE 85

Other combinations

| Oil No. | PE | DiPE | Acids | Low-temperature-side two-layer separation temperature (oil content, 20%), ° C. | | |
|---|---|---|---|---|---|---|
| | | | | R-290 | R-600a | R-1270 |
| Comparative oil 17B | 0.8 | 0.2 | LPt: 0.4 n-heptanoic acid: 0.4 TMHx: 0.2 | −50 or lower | −50 or lower | −50 or lower |
| Comparative oil 15B | | | refrigerant R-290/mineral oil for air conditioner | −50 or lower | −50 or lower | −50 or lower |
| Comparative oil 16B | | | complex ester obtained from PE, 2EHx, adipic acid, etc. | −50 or lower | −50 or lower | −50 or lower |
| Refrigerating machine oil B | | | Alcohol: neopentyl glycol Fatty acid: 2EHx | −50 or lower | −50 or lower | −50 or lower |

As shown in Table 66 to Table 75, the polyol ester oils each produced by esterifying an alcohol ingredient obtained by mixing pentaerythritol with dipentaerythritol and a fatty acid ingredient composed of at least one of pentanoic acid and hexanoic acid and at least one of octanoic acid and nonanoic acid are made to have various values of viscosity by changing the proportions of the raw materials with respect to each of specific raw material combinations.

Furthermore, as shown in Table 49 to Table 56, refrigeration oil compositions which are excellent in terms of solubility and lubricity can be produced even with hydrocarbon refrigerants having an exceedingly low global warming potential, by using polyol ester oils each produced by esterifying an alcohol ingredient obtained by mixing pentaerythritol with dipentaerythritol and a fatty acid ingredient composed of at least one of pentanoic acid and hexanoic acid and at least one of octanoic acid and nonanoic acid.

Moreover, as shown in Table 61 to Table 65, the polyol ester oils each produced by esterifying an alcohol ingredient obtained by mixing pentaerythritol with dipentaerythritol and a fatty acid ingredient composed of at least one of pentanoic acid and hexanoic acid and at least one of octanoic acid and nonanoic acid have the properties and performances which are required of refrigeration oils, as compared with the mineral oil (comparative oil 15B) for refrigerant R290 and with Comparative Example 1B, etc.

While the invention has been described in detail and with reference to specific embodiments thereof, it will be apparent to one skilled in the art that various changes and modifications can be made therein without departing from the spirit and scope thereof.

This application is based on a Japanese patent application filed on Dec. 27, 2011 (Application No. 2011-286045) and a Japanese patent application filed on Dec. 12, 2012 (Application No. 2012-270435), the contents thereof being incorporated herein by reference.

INDUSTRIAL APPLICABILITY

The present invention is useful as refrigeration oil compositions for hydrofluorocarbon-based refrigerants or hydrocarbon-based refrigerants.

The invention claimed is:
1. A working fluid, comprising:
a hydrofluorocarbon-based refrigerant; and
a refrigeration oil composition containing a polyol ester oil which is soluble with the hydrofluorocarbon-based refrigerant,
wherein the refrigerant consists essentially of R-32,
the polyol ester oil is a product of esterification of an alcohol ingredient containing pentaerythritol and dipentaerythritol and a fatty acid ingredient consisting of 2 methylbutanoic acid and at least one of 2-ethylhexanoic acid and 3,5,5-trimethylhexanoic acid, and
the 2-methylbutanoic acid accounts for 20 to 90 mole % of the total amount of the fatty acid ingredient.

2. The working fluid according to claim 1, wherein the hydrofluorocarbon-based refrigerant is soluble with the refrigeration oil composition in a range of +35° C. to +25° C.

3. The working fluid according to claim 1, further comprising at least one of an antioxidant, an epoxy-compound acid scavenger, and an extreme-pressure agent.

4. The working fluid according to claim 1, wherein the hydrofluorocarbon-based refrigerant composition contains at least one selected from the group consisting of R-32, R410A, and HFO-1234ze(E).

5. The working fluid according to claim 1, wherein the hydrofluorocarbon-based refrigerant composition consists of R-32 as the refrigerant.

* * * * *